(12) United States Patent
Lapstun et al.

(10) Patent No.: US 7,162,269 B2
(45) Date of Patent: Jan. 9, 2007

(54) METHOD AND SYSTEM FOR TELEPHONE CONTROL USING CODED MARKS

(75) Inventors: Paul Lapstun, Balmain (AU); Simon Robert Walmsley, Balmain (AU); Jacqueline Anne Lapstun, Balmain (AU); Kia Silverbrook, Balmain (AU)

(73) Assignee: Silverbrook Research Pty Ltd, Balmain (AU)

( * ) Notice: Subject to any disclaimer, the term of this patent is extended or adjusted under 35 U.S.C. 154(b) by 706 days.

(21) Appl. No.: 10/291,525

(22) Filed: Nov. 12, 2002

(65) Prior Publication Data

US 2003/0169864 A1    Sep. 11, 2003

Related U.S. Application Data

(63) Continuation of application No. 09/721,895, filed on Nov. 25, 2000.

(30) Foreign Application Priority Data

Dec. 1, 1999    (AU)    ................................ PQ4392

(51) Int. Cl.
    *H04B 1/38*    (2006.01)

(52) U.S. Cl. .................................. 455/557; 455/556.1
(58) Field of Classification Search ................ 455/557, 455/556.2, 554.1, 550.1, 410, 411, 418–420; 400/62; 358/402, 1.15; 347/5; 345/173, 345/179; 235/422, 375, 380
See application file for complete search history.

(56) References Cited

U.S. PATENT DOCUMENTS

| | | | |
|---|---|---|---|
| 4,864,618 A | 9/1989 | Wright et al. | |
| 5,051,736 A | 9/1991 | Bennett et al. | |
| 5,477,012 A | 12/1995 | Sekendur | |

(Continued)

FOREIGN PATENT DOCUMENTS

GB    2306669    5/1997

(Continued)

OTHER PUBLICATIONS

Dymetman, M., and Copperman, M., Intelligent Paper; in Electronic Publishing, Artistic Imaging, and Digital Typography, Proceedings of EP '98, Mar./Apr. 1998, Springer Verlag LNCS 1375, pp. 392-406.

*Primary Examiner*—Charles N. Appiah

(57) ABSTRACT

The invention concerns methods and systems for enabling telephones to be controlled through computer systems. Employing the invention involves the use of one or more control interfaces which are capable of being used to interact with a computer system or network, each interface comprising sheet material such as paper which has coded data printed on it and which allows it to be used to interact with the computer system by use of a sensing device operated by a user. Through this interaction, data from the control interface can be transmitted to the computer system to effect an operation relating to the functioning of the telephone. In this way, the computer system can invoke functions such as the making of outgoing calls, and the receiving and sending of text information such as short messages or retrieved telephone numbers.

21 Claims, 24 Drawing Sheets

U.S. PATENT DOCUMENTS

| | | | |
|---|---|---|---|
| 5,652,412 A | 7/1997 | Lazzouni | |
| 5,661,506 A | 8/1997 | Lazzouni et al. | |
| 5,692,073 A | 11/1997 | Cass | |
| 5,850,433 A | 12/1998 | Roneau | |
| 5,852,434 A | 12/1998 | Sekendur | |
| 5,861,877 A * | 1/1999 | Kagayama et al. | 345/179 |
| 5,966,663 A | 10/1999 | Gleason | |
| 6,076,734 A | 6/2000 | Dougherty | |
| 6,161,134 A | 12/2000 | Wen et al. | |
| 6,173,890 B1 * | 1/2001 | Shimizu et al. | 235/375 |
| 6,741,871 B1 * | 5/2004 | Silverbrook et al. | 455/557 |
| 6,766,945 B1 * | 7/2004 | Kia et al. | 235/380 |
| 6,789,731 B1 * | 9/2004 | Kia et al. | 235/380 |
| 6,832,717 B1 * | 12/2004 | Silverbrook et al. | 235/380 |

FOREIGN PATENT DOCUMENTS

| | | |
|---|---|---|
| WO | WO 98/44701 | 10/1998 |
| WO | WO 99/18487 | 4/1999 |
| WO | WO 99/19823 A | 4/1999 |
| WO | WO 99/49640 A | 9/1999 |
| WO | WO 99/50787 | 10/1999 |

* cited by examiner 990  991  992  993

FIXED INFORMATION ~ 994

VARIABLE INFORMATION ~ 995

COMMAND BUTTON ~ 996

INPUT FIELD ~ 997

● DRAGGABLE COMMAND ~ 998

HYPERTEXT LINK ~ 999

ADD NEW PHONE | USER NAME | PAGE 1 OF 1

ENTER THE DETAILS OF THE NEW PHONE TO BE ADDED

PHONE ALIAS   [PHONE ALIAS] ~545

PHONE NUMBER  [PHONE NBR] ~546

☐ FIXED PHONE
☐ MOBILE PHONE
☐ PABX PHONE

IF THIS PHONE HAS LOCAL NETWORK ACCESS PLEASE CHECK THE APPROPRIATE BOX BELOW
☐ BLUETOOTH
☐ IRDA

PHONE REGISTRATION PASSKEY   [PASSKEY] 547

SIGNATURE   [SIGNATURE]

532

( ADD PHONE )

FIG. 25

CONFIRM NEW PHONE DETAILS  PAGE 1 OF 1

YOU ARE ADDING THE FOLLOWING NEW PHONE

PHONE ALIAS   PHONE TYPE

MANUFACTURER   MODEL

PHONE NBR

DATE / TIME ADDED

IF THE ABOVE DETAILS ARE CORRECT PLEASE PRESS  548
<CALL PHONE>. YOUR NEW PHONE SHOULD RING ONCE.

( CALL PHONE )

IF THIS IS THE CORRECT PHONE PRESS CONFIRM TO COMPLETE ( CONFIRM )
549

METHOD AND SYSTEM FOR TELEPHONE CONTROL USING CODED MARKS

CROSS REFERENCE TO RELATED APPLICATIONS

The present application is a continuation of U.S. application Ser. No. 09/721,895, filed on Nov. 25, 2000, all of which are herein incorporated by reference.

CO-PENDING APPLICATIONS

Various methods, systems and apparatus relating to the present invention are disclosed in the following co-pending applications filed by the applicant or assignee of the present invention simultaneously with the present invention: 09/721,895, 09/721,894, 09/722,174, 09/721,896, 09/722,148, 09/722,146, 6,826,547, 6,741,871, 6,927,871, 6,980,306, 6,965,439, 6,788,982, 09/722,141, 6,788,293, 6,946,672, 09/722,172, 6,792,165, 09/722,088, 09/721,862, 6,530,339, 6,631,897, The disclosures of these co-pending applications are incorporated herein by cross-reference.

Various methods, systems and apparatus relating to the present invention are disclosed in the following co-pending applications filed by the applicant or assignee of the present invention on 20 Oct. 2000: 09/693,415, 09/693,219, 6,813,558, 6,965,454, 6,847,883, 09/693,647, 09/693,690, 09/693,593, 6,474,888, 6,627,870, 6,724,374, 09/693,514, 6,982,798, 6,454,482, 6,808,330, 6,527,365, 6,474,773, 6,550,997

The disclosures of these co-pending applications are incorporated herein by cross-reference.

Various methods, systems and apparatus relating to the present invention are disclosed in the following co-pending applications filed by the applicant or assignee of the present invention on 15 Sep. 2000: 6,679,420, 6,963,845, 6,995,859, 6,720,985

The disclosures of these co-pending applications are incorporated herein by cross-reference.

Various methods, systems and apparatus relating to the present invention are disclosed in the following co-pending applications filed by the applicant or assignee of the present invention on 30 Jun. 2000: 6,824,044, 09/608,970, 6,678,499, 6,976,220, 6,976,035, 6,766,942, 09/609,303, 6,922,779, 6,978,019, 09/607,843, 6,959,298, 6,973,450, 09/609,553, 6,965,882, 09/608,022, 09/609,232, 6,957,921, 6,457,883, 6,831,682, 6,977,751, 6,398,332, 6,394,573, 6,622,923

The disclosures of these co-pending applications are incorporated herein by cross-reference.

Various methods, systems and apparatus relating to the present invention are disclosed in the following co-pending applications filed by the applicant or assignee of the present invention on 23 May 2000: 09/575,197, 09/575,195, 09/575,159, 09/575,132, 09/575,123, 6,825,945, 09/575,130, 09/575,165, 6,813,039, 6,987,506, 09/575,131, 6,980,318, 6,816,274, 09/575,139, 09/575,186, 6,681,045, 6,728,000, 09/575,145, 09/575,192, 09/575,181, 09/575,193, 09/575,183, 6,789,194, 09/575,150, 6,789,191, 6,644,642, 6,502,614, 6,622,999, 6,669,385, 6,549,935, 6,987,573, 6,727,996, 6,591,884, 6,439,706, 6,760,119, 09/575,198, 6,290,349, 6,428,155, 6,785,016, 6,870,966, 6,822,639, 6,737,591, 09/575,154, 09/575,129, 6,830,196, 6,832,717, 09/575,189, 09/575,162, 09/575,172, 09/575,170, 09/575,171, 09/575,161, 6,428,133, 6,526,658, 6,315,399, 6,338,548, 6,540,319, 6,328,431, 6,328,425, 6,991,320, 6,383,833, 6,464,332, 6,390,591, 09/575,152, 6,328,417, 6,409,323, 6,281,912, 6,604,810, 6,318,920, 6,488,422, 6,795,215, 09/575,109, 6,859,289

The disclosures of these co-pending applications are incorporated herein by cross-reference.

FIELD OF INVENTION

The present invention relates generally to control devices and more specifically to methods and systems for enabling telephones to be controlled through distributed computer systems.

BACKGROUND

Telephone systems including fixed line and mobile telephones (hereinafter collectively referred to as "phones") are an essential communication tool in modern society. Advances in telecommunications has enabled both voice and data transmission over phones thereby allowing these phones to have additional functions such as short message services (SMS), network capability such as email, and Internet access. There are also a variety of standard (and de facto standard) local-area and personal-area wireless (WLAN and WPAN) protocols which a phone may utilize to provide local network access, for example via radio or infrared.

Phones are traditionally controlled via the use of keypads to enter the required phone numbers. Other control functions include last number redial and, in more advanced systems, voice-activated dialing.

The form factor of phones may be constrained by their need to provide a user interface in the form of a keypad and/or a display.

SUMMARY OF INVENTION

It is an objective of the present invention to provide a new system and method for enabling telephones to be controlled through a computer system.

In a first aspect, the present invention provides a method of enabling at least one function of a telephone to be controlled, the telephone being operative to perform the at least one function in response to at least one command from a computer system, the method including the steps of:

providing a control interface containing information relating to the at least one function, the control interface including coded data indicative of an identity of the control interface and of at least one reference point of the control interface;

receiving, in the computer system, indicating data from a sensing device regarding the identity of the control interface and a position of the sensing device relative to the control interface, the sensing device, when placed in an operative position relative to the control interface, generating the indicating data using at least some of the coded data; and effecting, in the computer system and from the indicating data, at least one operation relating to the at least one command.

Preferably, the at least one operation is associated with at least one zone of the control interface and the method includes effecting, in the computer system and from the zone relative to which the sensing device is located, the at least one operation.

Preferably also, the method includes:

receiving, in the computer system, movement data regarding movement of the sensing device relative to the control interface, the sensing device, when moved relative to the control interface, generating the movement data using at least some of the coded data; and effecting, in the computer system and from the movement data indicating movement of the sensing device at least partially within said at least one zone, the at least one operation.

In a second aspect, the present invention provides a method of enabling at least one function of a telephone to be controlled, the telephone being operative to perform the at least one function in response to at least one command from a computer system, the method including the steps of:

providing a control interface containing information relating to the at least one function, the control interface including coded data indicative of at least one operation relating to the at least one command;

receiving, in the computer system and from the sensing device, indicating data ragarding the at least one operation and movement data regarding movement of the sensing device relative to the control interface, the sensing device, when moved relative to the control interface, generating the indicating data using at least some of the coded data and generating the movement data; and effecting, in the computer system and from the indicating data and the movement data, the at least one operation.

In a third aspect, the present invention provides a method of enabling at least one function of a telephone to be controlled, the telephone being operative to perform the at least one function in response to at least one command from a computer system, the method including the steps of:

providing a user with a control interface containing information relating to the at least one function, the control interface including coded data indicative of at least one operation relating to the at least one command;

receiving, in the computer system, identity data from a sensing device regarding an identity of the user, the sensing device containing the identity data;

receiving, in the computer system, indicating data from the sensing device regarding the at least one operation, the sensing device, when placed in an operative position relative to the control interface, generating the indicating data using at least some of the coded data; and effecting, in the computer system and from the identity data and the indicating data, at least one operation relating to the at least one command.

In a fourth aspect, the present invention provides a system for enabling at least one function of a telephone to be controlled, the telephone being operative to perform the at least one function in response to at least one command, the system including:

a control interface containing information relating to the at least one function, the control interface including coded data indicative of an identity of the control interface and of at least one reference point of the control interface; and a computer system operative to receive indicating data from a sensing device for effecting at least one operation relating to the at least one command, the indicating data being indicative of the identity of the control interface and a position of the sensing device relative to the control interface, the sensing device generating the indicating data using at least some of the coded data.

Preferably, the at least one operation relating to the at least one command is associated with at least one zone of the control interface.

In a fifth aspect, the present invention provides a system for enabling at least one function of a telephone to be controlled, the telephone being operative to perform the at least one function in response to at least one command, the system including:

a control interface containing information relating to the at least one function, the control interface including coded data indicative of at least one operation relating to the at least one command; and a computer system operative to receive, from a sensing device, indicating data regarding said at least one operation and movement data regarding movement of the sensing device relative to the control interface, and for effecting, from the indicating data and the movement data, the at least one operation relating to the at least one command, the sensing device, when moved relative to the control interface, generating the indicating data using at least some of the coded data and generating the movement data.

In a sixth aspect, the present invention provides a system for enabling at least one function of a telephone to be controlled, the telephone being operative to perform the at least one function in response to at least one command, the system including:

a control interface including coded data indicative of an identity of the control interface; and a computer system operative to receive, from a sensing device, identity data regarding an identity of a user and indicating data regarding the identity of the control interface, and for effecting, from the identity data and the indicating data, at least one operation relating to the at least one command, the sensing device containing the identity data and generating the indicating data using at least some of the coded data.

Accordingly, the present invention provides methods and systems which utilize one or more telephone control interfaces capable of being used to interact with a computer system. Whilst the novel methods and systems of the present invention may be used in conjunction with a single computer system, they are also readily adapted to operate by means of a computer network, such as the Internet.

Physically, a control interface is disposed on a surface medium of any suitable structure. However, in a preferred arrangement, the control interface is disposed on sheet material such as paper or the like which has the coded data printed on it and which allows interaction with the computer system. The coded data is detectable preferably, but not exclusively, outside the visible spectrum, thereby enabling it to be machine-readable but substantially invisible to the average human eye. The control interface may also include visible material which provides information to a user, such as the application or purpose of the interface, and which visible information may be registered or correlate in position with the relevant hidden coded data.

The system also includes a sensing device to convey data from the control interface to the computer system, and in some instances, to contribute additional data. Again, the sensing device may take a variety of forms but is preferably compact and easily portable. In a particularly preferred arrangement, the sensing device is configured as a pen which is designed to be able to physically mark the control interface as well as to selectively enable the coded data from the control interface to be read and transmitted to the computer system. The coded data then provides control information, configured such that designation thereof by a user causes instructions to be applied to the software running on the computer system or network.

The nature of the interaction between the telephone control interface and the sensing device and the data that each contributes to the computer system may vary. In one arrangement, the coded data on the control interface is indicative of the identity of the interface and of at least one reference point on that interface. In another embodiment, the interface includes coded data which is more directly indicative of an operation related to the interface, whereas the sensing device is operative to provide data regarding its own movement relative to that interface to the computer system together with coded data from the interface. In yet another arrangement, the control interface includes the coded data which at least identifies the interface, and the sensing device is designed to provide, to the computer system, data based on the interface coded data, and also on data which identifies the user of the device.

The system and method also preferably employs specially designed printers to print the telephone control interfaces. Furthermore, these printers constitute or form part of the computer system and are designed to receive data from the sensing device. As indicated above, the system and method of the invention is ideally suited to operate over a network. In this arrangement, the printers are fully integrated into the network and allow for printing of the interactive forms on demand and also for distributing of the control interfaces using a mixture of multicast and pointcast communication protocols.

Accordingly, in a preferred form, the present invention provides methods and systems which use a paper and stylus or pen based interface for a computer system. This provides many significant benefits over traditional computer systems. The advantage of paper is that it is widely used to display and record information. Further, printed information is easier to read than information displayed on a computer screen. Moreover, paper does not run on batteries, can be read in bright light, or robustly accepts coffee spills or the like and is portable and disposable. Furthermore, the system allows for hand-drawing and hand-writing to be captured which affords greater richness of expression than input via a computer keyboard and mouse.

The present invention therefore provides a novel system and method for enabling a telephone to be controlled through a computer system making use of novel interactive surface media.

The telephone is operative to perform at least one function in response to commands from the computer system. These functions may include dialling, or making an outgoing call to a predetermined number on the telephone, causing text information to be received in the telephone or issuing text information from the telephone. This text information may include telephone numbers, contact details, or a short message. The telephone may also be caused to receive an incoming call from a predetermined entity in response to the control instructions.

BRIEF DESCRIPTION OF DRAWINGS

Preferred and other embodiments of the invention will now be described, by way of non-limiting example only, with reference to the accompanying drawings, in which:

FIG. 5c is a plan view showing an arrangement of nine of the tags shown in FIG. 5a where targets are shared between adjacent tags;

FIG. 5d is a plan view showing the interleaving and rotation of the symbols of the four codewords of the tag shown in FIG. 5a;

FIG. 25 is a schematic view of an add new phone list;

FIG. 26 is a schematic view of a confirm new phone list;

DETAILED DESCRIPTION OF PREFERRED AND OTHER EMBODIMENTS

Note: Memjet™ is a trademark of Silverbrook Research Pty Ltd, Australia.

In the preferred embodiment, the invention is configured to work with the netpage networked computer system, a summary of which is given below and a detailed description of which is given in our co-pending applications, including in particular applications U.S. Ser. Nos. 09/721,893, 09/722,142, 09/575,129, and 09/575,141. It will be appreciated that not every implementation will necessarily embody all or even most of the specific details and extensions described in these applications in relation to the basic system. However, the system is described in its most complete form to assist in understanding the context in which the preferred embodiments and aspects of the present invention operate.

In brief summary, the preferred form of the netpage system employs a computer interface in the form of a mapped surface, that is, a physical surface which contains references to a map of the surface maintained in a computer system. The map references can be queried by an appropriate sensing device. Depending upon the specific implementation, the map references may be encoded visibly or invisibly, and defined in such a way that a local query on the mapped surface yields an unambiguous map reference both within the map and among different maps. The computer system can contain information about features on the mapped surface, and such information can be retrieved based on map references supplied by a sensing device used with the mapped surface. The information thus retrieved can take the form of actions which are initiated by the computer system on behalf of the operator in response to the operator's interaction with the surface features.

In its preferred form, the netpage system relies on the production of, and human interaction with, netpages. These are pages of text, graphics and images printed on ordinary paper or other media, but which work like interactive web pages. Information is encoded on each page using ink which is substantially invisible to the unaided human eye. The ink, however, and thereby the coded data, can be sensed by an optically imaging pen and transmitted to the netpage system.

In the preferred form, active buttons and hyperlinks on each page can be clicked with the pen to request information from the network or to signal preferences to a network server. In one embodiment, text written by hand on a netpage is automatically recognized and converted to computer text in the netpage system, allowing forms to be filled in. In other embodiments, signatures recorded on a netpage are automatically verified, allowing e-commerce transactions to be securely authorized.

Figure 1:
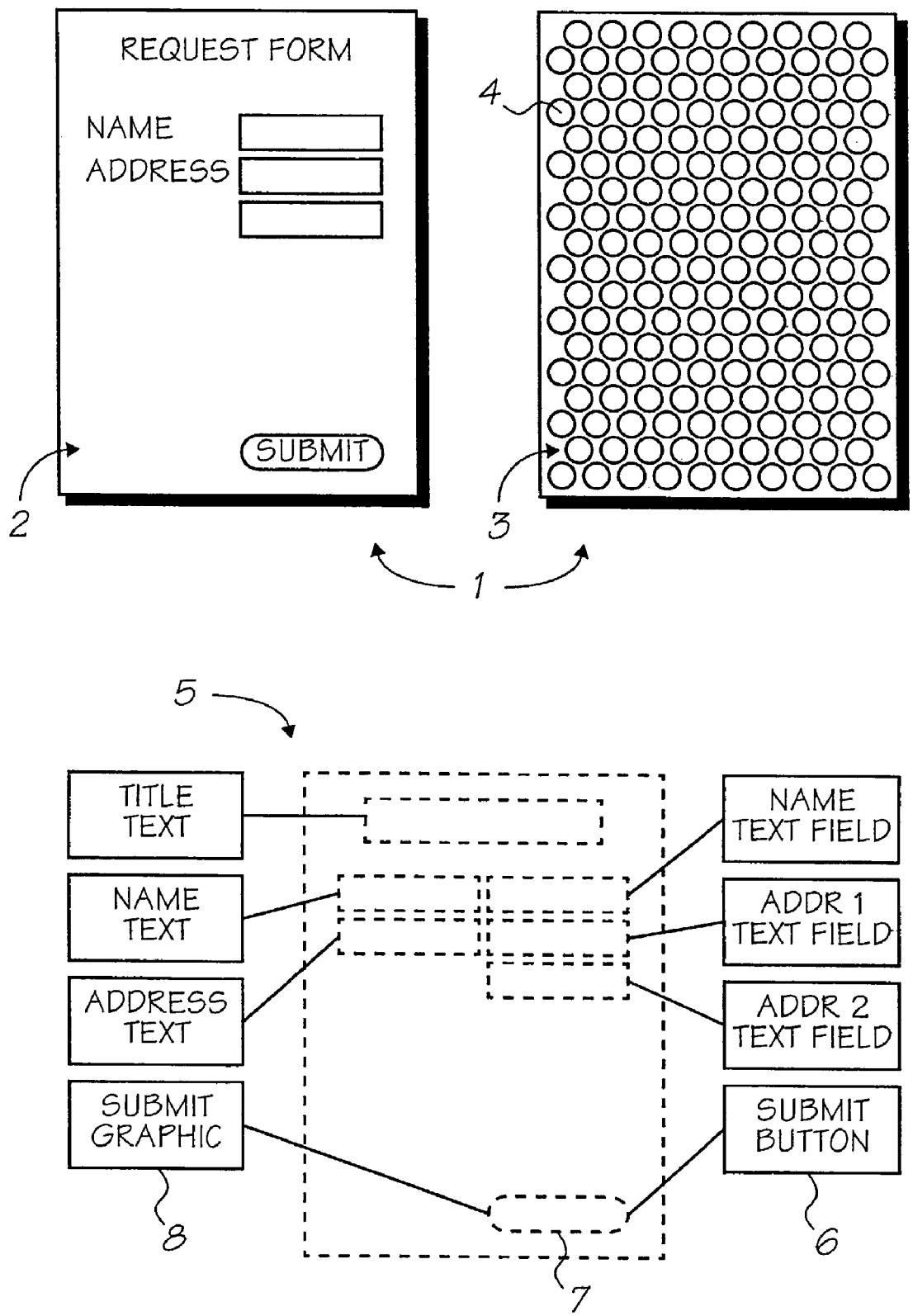
FIG. 1 is a schematic of a the relationship between a sample printed netpage and its online page description.

As illustrated in FIG. 1, a printed netpage 1 can represent a interactive form which can be filled in by the user both physically, on the printed page, and "electronically", via communication between the pen and the netpage system. The example shows a "Request" form containing name and address fields and a submit button. The netpage consists of graphic data 2 printed using visible ink, and coded data 3 printed as a collection of tags 4 using invisible ink. The corresponding page description 5, stored on the netpage network, describes the individual elements of the netpage. In particular it describes the type and spatial extent (zone) of each interactive element (i.e. text field or button in the example), to allow the netpage system to correctly interpret input via the netpage. The submit button 6, for example, has a zone 7 which corresponds to the spatial extent of the corresponding graphic 8.

Figure 2:
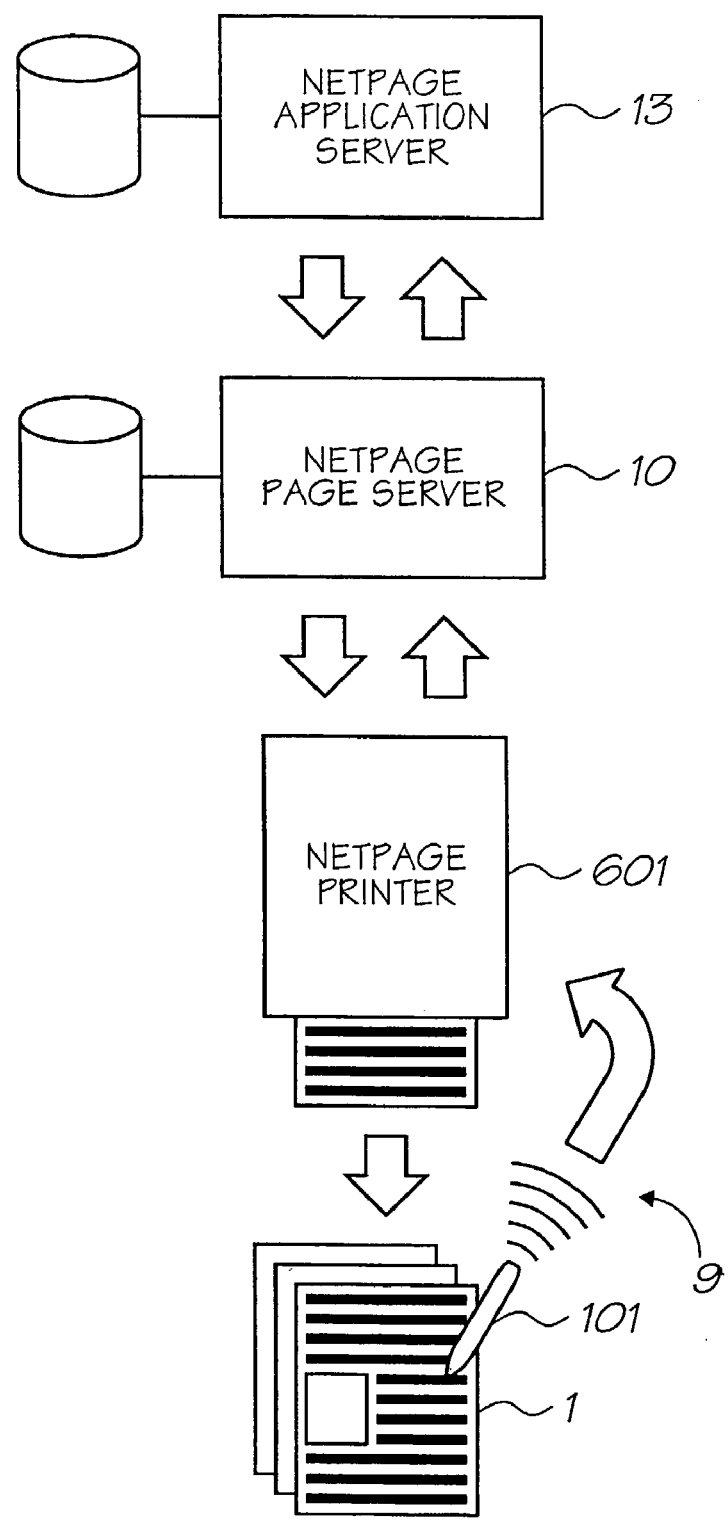
FIG. 2 is a schematic view of a interaction between a netpage pen, a netpage printer, a netpage page server, and a netpage application server.

As illustrated in FIG. 2, the netpage pen 101, a preferred form of which is described in our co-pending application U.S. Ser. No. 09/721,893, works in conjunction with a netpage printer 601, an Internet-connected printing appliance for home, office or mobile use. The pen is wireless and communicates securely with the netpage printer via a short-range radio link 9.

The netpage printer 601, preferred forms of which are described in our co-pending applications U.S. Ser. Nos. 09/722,142 and 09/693,514, is able to deliver, periodically or on demand, personalized newspapers, magazines, catalogs, brochures and other publications, all printed at high quality as interactive netpages. Unlike a personal computer, the netpage printer is an appliance which can be, for example, wall-mounted adjacent to an area where the morning news is first consumed, such as in a user's kitchen, near a breakfast table, or near the household's point of departure for the day. It also comes in tabletop, desktop, portable and miniature versions.

Netpages printed at their point of consumption combine the ease-of-use of paper with the timeliness and interactivity of an interactive medium.

As shown in FIG. 2, the netpage pen 101 interacts with the coded data on a printed netpage 1 and communicates, via a short-range radio link 9, the interaction to a netpage printer. The printer 601 sends the interaction to the relevant netpage page server 10 for interpretation. In appropriate circumstances, the page server sends a corresponding message to application computer software running on a netpage application server 13. The application server may in turn send a response which is printed on the originating printer.

The netpage system is made considerably more convenient in the preferred embodiment by being used in conjunction with high-speed microelectromechanical system (MEMS) based inkjet (Memjet™) printers, for example as described in our co-pending application U.S. Ser. No. 09/575,141. In the preferred form of this technology, relatively high-speed and high-quality printing is made more affordable to consumers. In its preferred form, a netpage publication has the physical characteristics of a traditional newsmagazine, such as a set of letter-size glossy pages printed in full color on both sides, bound together for easy navigation and comfortable handling.

The netpage printer exploits the growing availability of broadband Internet access. The netpage printer can also operate with slower connections, but with longer delivery times and lower image quality. The netpage system can also be enabled using existing consumer inkjet and laser printers, although the system will operate more slowly and will therefore be less acceptable from a consumer's point of view. In other embodiments, the netpage system is hosted on a private intranet. In still other embodiments, the netpage system is hosted on a single computer or computer-enabled device, such as a printer.

Netpage publication servers 14 on the netpage network are configured to deliver print-quality publications to netpage printers. Periodical publications are delivered automatically to subscribing netpage printers via pointcasting and multicasting Internet protocols. Personalized publications are filtered and formatted according to individual user profiles.

A netpage printer can be configured to support any number of pens, and a pen can work with any number of netpage printers. In the preferred implementation, each netpage pen has a unique identifier. A household may have a collection of colored netpage pens, one assigned to each member of the family. This allows each user to maintain a distinct profile with respect to a netpage publication server or application server.

A netpage pen can also be registered with a netpage registration server 11 and linked to one or more payment card accounts. This allows e-commerce payments to be securely authorized using the netpage pen. The netpage registration server compares the signature captured by the netpage pen with a previously registered signature, allowing it to authenticate the user's identity to an e-commerce server. Other biometrics can also be used to verify identity. A version of the netpage pen includes fingerprint scanning, verified in a similar way by the netpage registration server.

Although a netpage printer may deliver periodicals such as the morning newspaper without user intervention, it can be configured never to deliver unsolicited junk mail. In its preferred form, it only delivers periodicals from subscribed or otherwise authorized sources. In this respect, the netpage printer is unlike a fax machine or e-mail account which is visible to any junk mailer who knows the telephone number or e-mail address.

Each object model in the system is described using a Unified Modeling Language (UML) class diagram. A class diagram consists of a set of object classes connected by relationships, and two kinds of relationships are of interest here: associations and generalizations. An association represents some kind of relationship between objects, i.e. between instances of classes. A generalization relates actual classes, and can be understood in the following way: if a class is thought of as the set of all objects of that class, and class A is a generalization of class B, then B is simply a subset of A. Each class is drawn as a rectangle labeled with the name of the class. It contains a list of the attributes of the class, separated from the name by a horizontal line, and a list of the operations of the class, separated from the attribute list by a horizontal line. In the class diagrams which follow, however, operations are never modeled. An association is drawn as a line joining two classes, optionally labeled at either end with the multiplicity of the association. The default multiplicity is one. An asterisk (*) indicates a multiplicity of "many", i.e. zero or more. Each association is optionally labeled with its name, and is also optionally labeled at either end with the role of the corresponding class. An open diamond indicates an aggregation association ("is-part-of"), and is drawn at the aggregator end of the association line. A generalization relationship ("is-a") is drawn as a solid line joining two classes, with an arrow (in the form of an open triangle) at the generalization end. When a class diagram is broken up into multiple diagrams, any class which is duplicated is shown with a dashed outline in all but the main diagram which defines it. It is shown with attributes only where it is defined.

Netpages are the foundation on which a netpage network is built. They provide a paper-based user interface to published information and interactive services. A netpage consists of a printed page (or other surface region) invisibly tagged with references to an online description of the page. The online page description is maintained persistently by a netpage page server. The page description describes the visible layout and content of the page, including text, graphics and images. It also describes the input elements on the page, including buttons, hyperlinks, and input fields. A netpage allows markings made with a netpage pen on its surface to be simultaneously captured and processed by the netpage system.

Multiple netpages can share the same page description. However, to allow input through otherwise identical pages to be distinguished, each netpage is assigned a unique page identifier. This page ID has sufficient precision to distinguish between a very large number of netpages.

Each reference to the page description is encoded in a printed tag. The tag identifies the unique page on which it appears, and thereby indirectly identifies the page description. The tag also identifies its own position on the page. Characteristics of the tags are described in more detail below.

Tags are printed in infrared-absorptive ink on any substrate which is infrared-reflective, such as ordinary paper. Near-infrared wavelengths are invisible to the human eye but are easily sensed by a solid-state image sensor with an appropriate filter.

A tag is sensed by an area image sensor in the netpage pen, and the tag data is transmitted to the netpage system via the nearest netpage printer. The pen is wireless and communicates with the netpage printer via a short-range radio link. Tags are sufficiently small and densely arranged that the pen can reliably image at least one tag even on a single click on the page. It is important that the pen recognize the page ID and position on every interaction with the page, since the interaction is stateless. Tags are error-correctably encoded to make them partially tolerant to surface damage.

The netpage page server maintains a unique page instance for each printed netpage, allowing it to maintain a distinct set of user-supplied values for input fields in the page description for each printed netpage.

Figure 3:
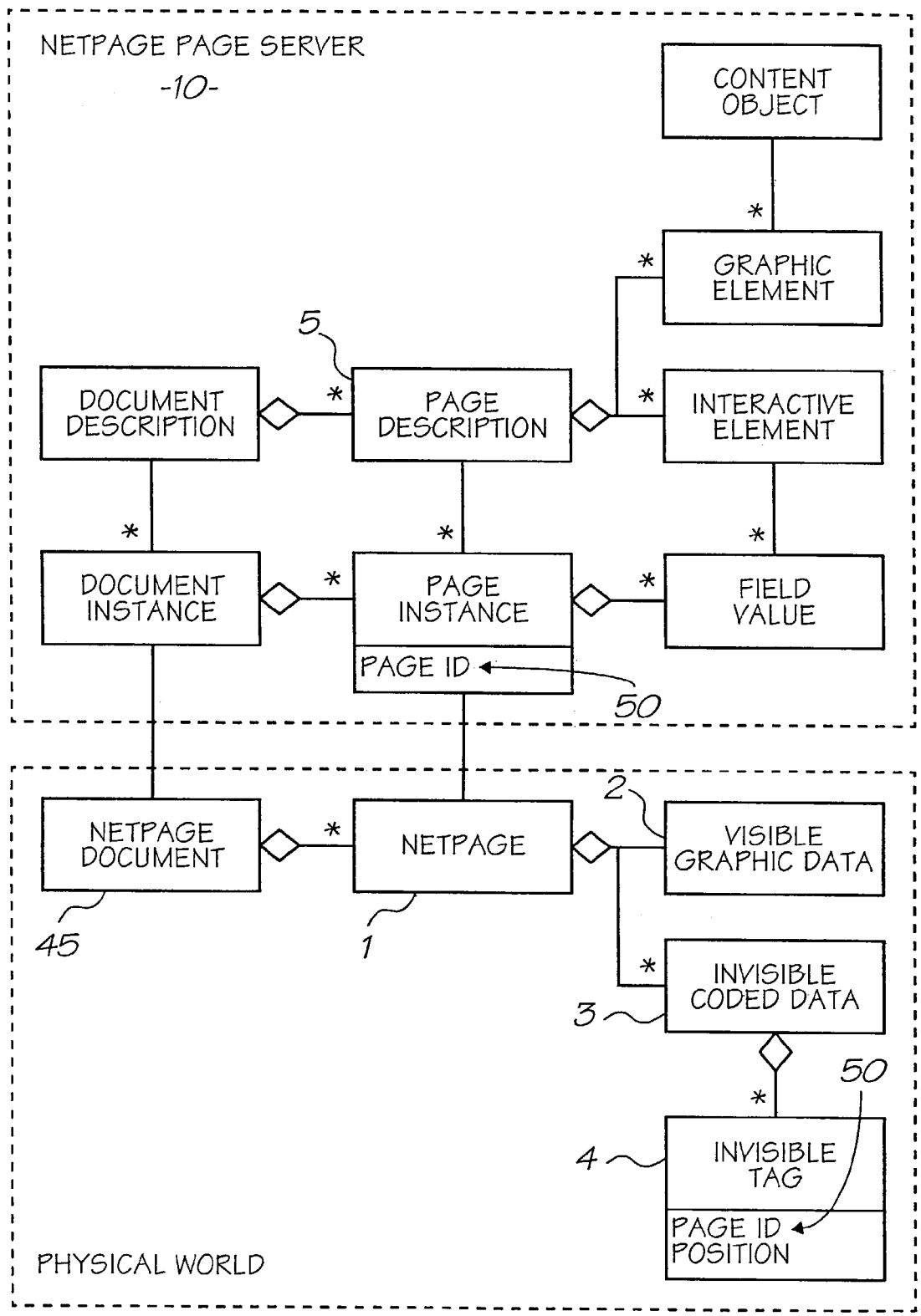
FIG. 3 is a schematic view of a high-level structure of a printed netpage and its online page description.

The relationship between the page description, the page instance, and the printed netpage is shown in FIG. 3. The printed netpage may be part of a printed netpage document 45. The page instance is associated with both the netpage printer which printed it and, if known, the netpage user who requested it.

In a preferred form, each tag identifies the region in which it appears, and the location of that tag within the region. A tag may also contain flags which relate to the region as a whole or to the tag. One or more flag bits may, for example, signal a tag sensing device to provide feedback indicative of a function associated with the immediate area of the tag, without the sensing device having to refer to a description of the region. A netpage pen may, for example, illuminate an "active area" LED when in the zone of a hyperlink.

In a preferred embodiment, each tag contains an easily recognized invariant structure which aids initial detection, and which assists in minimizing the effect of any warp induced by the surface or by the sensing process. The tags preferably tile the entire page, and are sufficiently small and densely arranged that the pen can reliably image at least one tag even on a single click on the page. It is important that the pen recognize the page ID and position on every interaction with the page, since the interaction is stateless.

In a preferred embodiment, the region to which a tag refers coincides with an entire page, and the region ID encoded in the tag is therefore synonymous with the page ID of the page on which the tag appears. In other embodiments, the region to which a tag refers can be an arbitrary subregion of a page or other surface. For example, it can coincide with the zone of an interactive element, in which case the region ID can directly identify the interactive element.

Each tag contains typically contains 16 bits of tag ID, at least 90 bits of region ID, and a number of flag bits. Assuming a maximum tag density of 64 per square inch, a 16-bit tag ID supports a region size of up to 1024 square inches. Larger regions can be mapped continuously without increasing the tag ID precision simply by using abutting regions and maps. The distinction between a region ID and a tag ID is mostly one of convenience. For most purposes the concatenation of the two can be considered as a globally unique tag ID. Conversely, it may also be convenient to introduce structure into the tag ID, for example to define the x and y coordinates of the tag. A 90-bit region ID allows $2^{90}$ ($\sim 10^{27}$ or a thousand trillion trillion) different regions to be uniquely identified. Tags may also contain type information, and a region may be tagged with a mixture of tag types. For example, a region may be tagged with one set of tags encoding x coordinates and another set, interleaved with the first, encoding y coordinates.

In one embodiment, 120 bits of tag data are redundantly encoded using a (15, 5) Reed-Solomon code. This yields 360 encoded bits consisting of 6 codewords of 15 4-bit symbols each. The (15, 5) code allows up to 5 symbol errors to be corrected per codeword, i.e. it is tolerant of a symbol error rate of up to 33% per codeword. Each 4-bit symbol is represented in a spatially coherent way in the tag, and the symbols of the six codewords are interleaved spatially within the tag. This ensures that a burst error (an error affecting multiple spatially adjacent bits) damages a minimum number of symbols overall and a minimum number of symbols in any one codeword, thus maximising the likelihood that the burst error can be fully corrected.

Any suitable error-correcting code code can be used in place of a (15, 5) Reed-Solomon code, for example a Reed-Solomon code with more or less redundancy, with the same or different symbol and codeword sizes; another block code; or a different kind of code, such as a convolutional code (see, for example, Stephen B. Wicker, Error Control Systems for Digital Communication and Storage, Prentice-Hall 1995, the contents of which a herein incorporated by cross-reference).

Figure 4A:
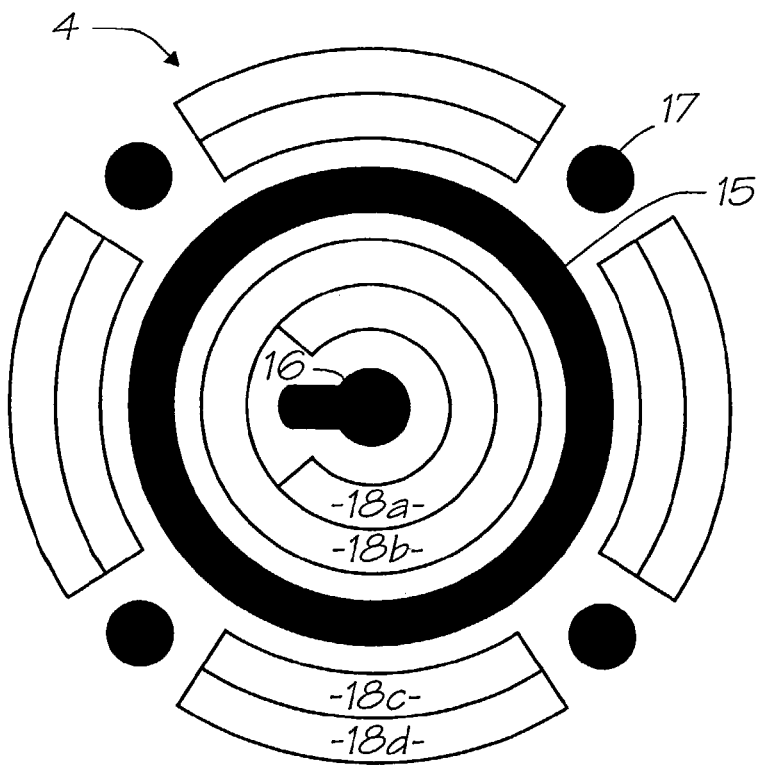
FIG. 4a is a plan view showing a structure of a netpage tag.

One embodiment of the physical representation of the tag, shown in FIG. 4a and described in our co-pending application U.S. Ser. No. 09/575,129, includes fixed target structures 15, 16, 17 and variable data areas 18. The fixed target structures allow a sensing device such as the netpage pen to detect the tag and infer its three-dimensional orientation relative to the sensor. The data areas contain representations of the individual bits of the encoded tag data. To maximise its size, each data bit is represented by a radial wedge in the form of an area bounded by two radial lines and two concentric circular arcs. Each wedge has a minimum dimension of 8 dots at 1600 dpi and is designed so that its base (its inner arc), is at least equal to this minimum dimension. The height of the wedge in the radial direction is always equal to the minimum dimension. Each 4-bit data symbol is represented by an array of 2×2 wedges. The fifteen 4-bit data symbols of each of the six codewords are allocated to the four concentric symbol rings 18a to 18d in interleaved fashion. Symbols are allocated alternately in circular progression around the tag. The interleaving is designed to maximise the average spatial distance between any two symbols of the same codeword.

Figure 4B:
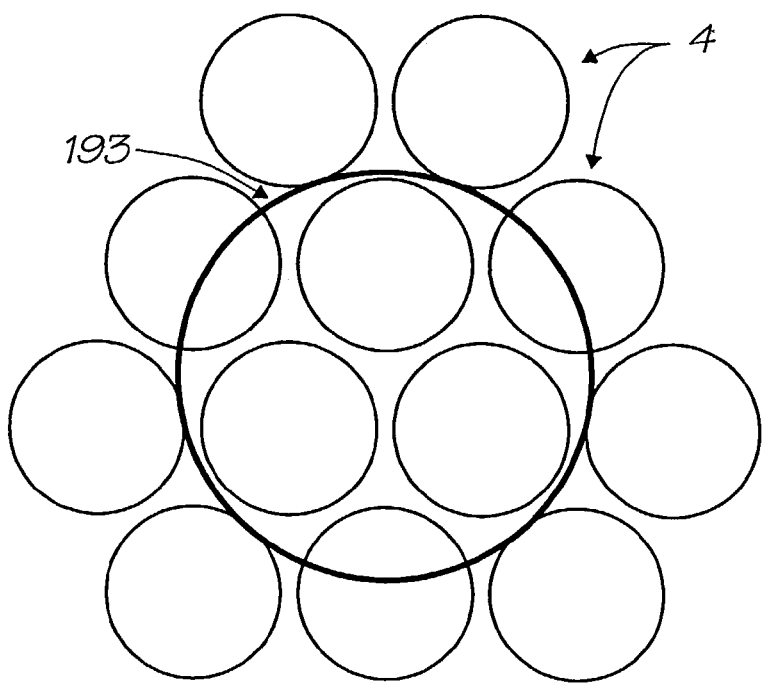
FIG. 4b is a plan view showing a relationship between a set of the tags shown in FIG. 4a and a field of view of a netpage sensing device in the form of a netpage pen.

In order to support "single-click" interaction with a tagged region via a sensing device, the sensing device must be able to see at least one entire tag in its field of view no matter where in the region or at what orientation it is positioned. The required diameter of the field of view of the sensing device is therefore a function of the size and spacing of the tags. Assuming a circular tag shape, the minimum diameter of the sensor field of view 193 is obtained when the tags are tiled on a equilateral triangular grid, as shown in FIG. 4b.

The tag structure just described is designed to allow both regular tilings of planar surfaces and irregular tilings of non-planar surfaces. Regular tilings are not, in general, possible on non-planar surfaces. In the more usual case of planar surfaces where regular tilings of tags are possible, i.e. surfaces such as sheets of paper and the like, more efficient tag structures can be used which exploit the regular nature of the tiling.

Figure 5A:
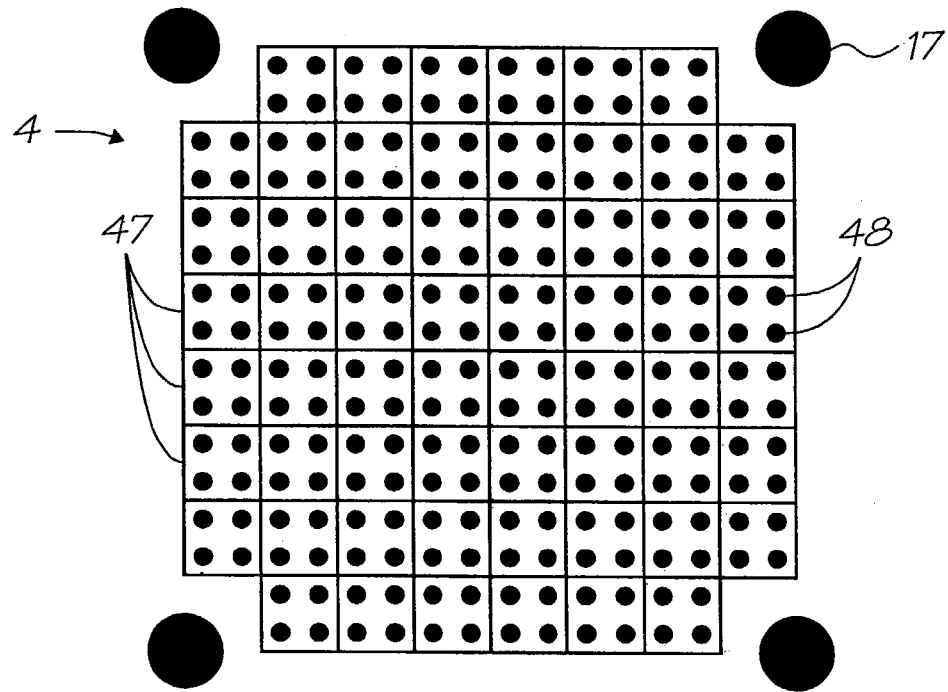
FIG. 5a is a plan view showing an alternative structure of a netpage tag.
Figure 5B:
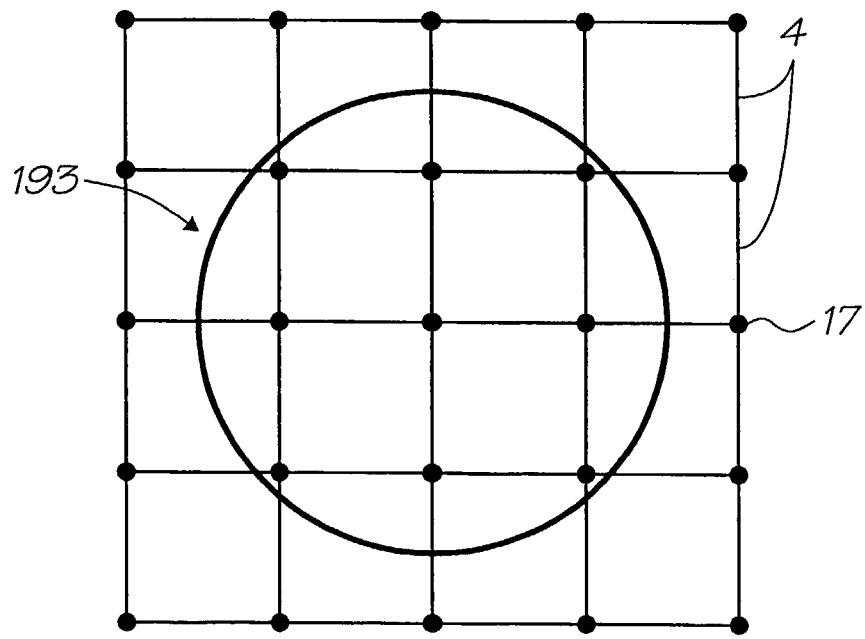
FIG. 5b is a plan view showing a relationship between a set of the tags shown in FIG. 5a and a field of view of a netpage sensing device in the form of a netpage pen.
Figures 5C, 5D:
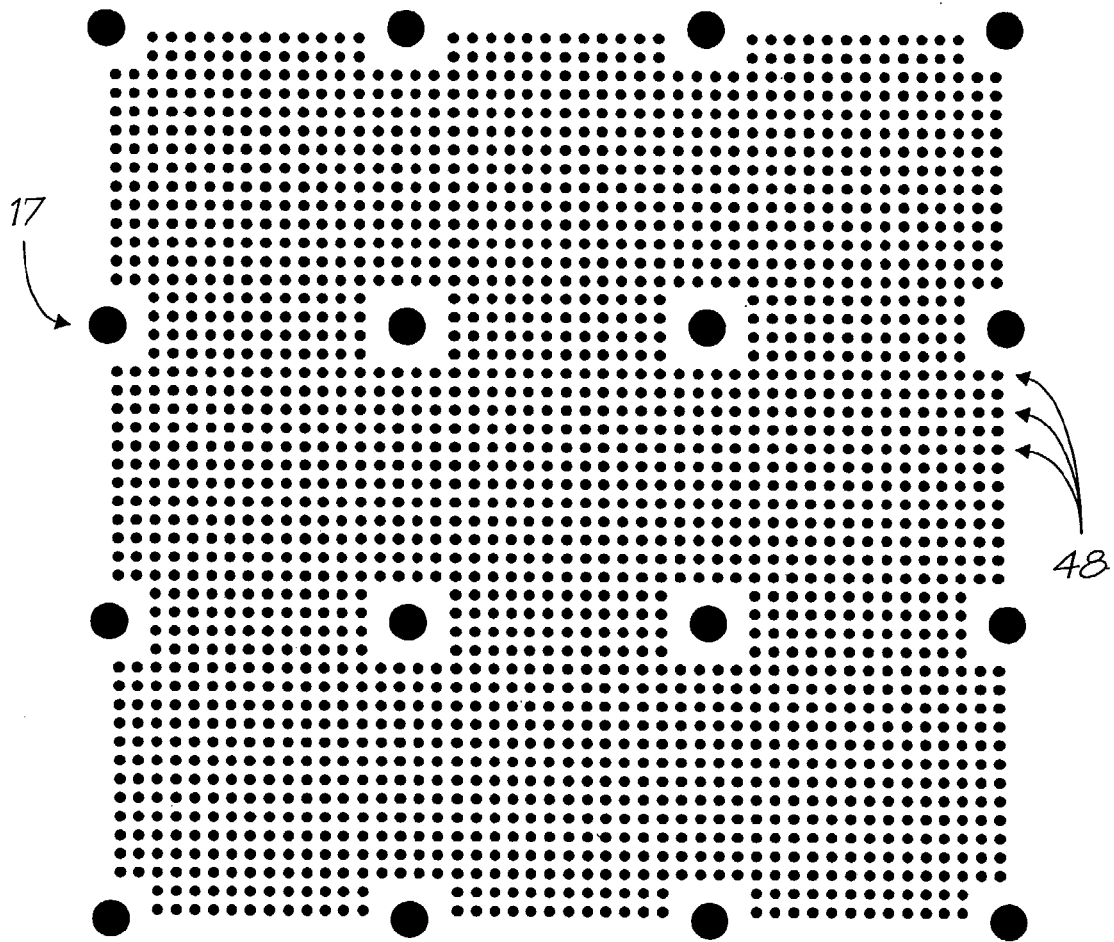

An alternative tag structure more suited to a regular tiling is shown in FIG. 5a. The tag 4 is square and has four perspective targets 17. It is similar in structure to tags described by Bennett et al. in U.S. Pat. No. 5,051,746. The tag represents sixty 4-bit Reed-Solomon symbols 47, for a total of 240 bits. The tag represents each one bit as a dot 48, and each zero bit by the absence of the corresponding dot. The perspective targets are designed to be shared between adjacent tags, as shown in FIGS. 5b and 5c. FIG. 5b shows a square tiling of 16 tags and the corresponding minimum field of view 193, which must span the diagonals of two tags. FIG. 5c shows a square tiling of nine tags, containing all one bits for illustration purposes.

Using a (15, 7) Reed-Solomon code, 112 bits of tag data are redundantly encoded to produce 240 encoded bits. The four codewords are interleaved spatially within the tag to maximize resilience to burst errors. Assuming a 16-bit tag ID as before, this allows a region ID of up to 92 bits. The data-bearing dots 48 of the tag are designed to not overlap their neighbors, so that groups of tags cannot produce structures which resemble targets. This also saves ink. The perspective targets therefore allow detection of the tag, so further targets are not required.

Although the tag may contain an orientation feature to allow disambiguation of the four possible orientations of the tag relative to the sensor, it is also possible to embed orientation data in the tag data. For example, the four codewords can be arranged so that each tag orientation contains one codeword placed at that orientation, as shown in FIG. 5d, where each symbol is labelled with the number of its codeword (1–4) and the position of the symbol within the codeword (A–O). Tag decoding then consists of decoding one codeword at each orientation. Each codeword can either contain a single bit indicating whether it is the first codeword, or two bits indicating which codeword it is. The latter approach has the advantage that if, say, the data content of only one codeword is required, then at most two codewords need to be decoded to obtain the desired data. This may be the case if the region ID is not expected to change within a stroke and is thus only decoded at the start of a stroke. Within a stroke only the codeword containing the tag ID is then desired. Furthermore, since the rotation of the sensing device changes slowly and predictably within a stroke, only one codeword typically needs to be decoded per frame.

It is possible to dispense with perspective targets altogether and instead rely on the data representation being self-registering. In this case each bit value (or multi-bit value) is typically represented by an explicit glyph, i.e. no bit value is represented by the absence of a glyph. This ensures that the data grid is well-populated, and thus allows the grid to be reliably identified and its perspective distortion detected and subsequently corrected during data sampling. To allow tag boundaries to be detected, each tag data must contain a marker pattern, and these must be redundantly encoded to allow reliable detection. The overhead of such marker patterns is similar to the overhead of explicit perspective targets. One such scheme uses dots positioned a various points relative to grid vertices to represent different glyphs and hence different multi-bit values (see Anoto Technology Description, Anoto April 2000).

Decoding a tag results in a region ID, a tag ID, and a tag-relative pen transform. Before the tag ID and the tag-relative pen location can be translated into an absolute location within the tagged region, the location of the tag within the region must be known. This is given by a tag map, a function which maps each tag ID in a tagged region to a corresponding location. A tag map reflects the scheme used to tile the surface region with tags, and this can vary according to surface type. When multiple tagged regions share the same tiling scheme and the same tag numbering scheme, they can also share the same tag map. The tag map for a region must be retrievable via the region ID. Thus, given a region ID, a tag ID and a pen transform, the tag map can be retrieved, the tag ID can be translated into an absolute tag location within the region, and the tag-relative pen location can be added to the tag location to yield an absolute pen location within the region.

The tag ID may have a structure which assists translation through the tag map. It may, for example, encoded Cartesian coordinates or polar coordinates, depending on the surface type on which it appears. The tag ID structure is dictated by and known to the tag map, and tag IDs associated with different tag maps may therefore have different structures.

Two distinct surface coding schemes are of interest, both of which use the tag structure described earlier in this section. The preferred coding scheme uses "location-indicating" tags as already discussed. An alternative coding scheme uses "object-indicating" (or "function-indicating") tags.

A location-indicating tag contains a tag ID which, when translated through the tag map associated with the tagged region, yields a unique tag location within the region. The tag-relative location of the pen is added to this tag location to yield the location of the pen within the region. This in turn is used to determine the location of the pen relative to a user interface element in the page description associated with the region. Not only is the user interface element itself identified, but a location relative to the user interface element is identified. Location-indicating tags therefore trivially support the capture of an absolute pen path in the zone of a particular user interface element.

An object-indicating (or function-indicating) tag contains a tag ID which directly identifies a user interface element in the page description associated with the region (or equivalently, a function). All the tags in the zone of the user interface element identify the user interface element, making them all identical and therefore indistinguishable. Object-indicating tags do not, therefore, support the capture of an absolute pen path. They do, however, support the capture of a relative pen path. So long as the position sampling frequency exceeds twice the encountered tag frequency, the displacement from one sampled pen position to the next within a stroke can be unambiguously determined. As an alternative, the netpage pen 101 can contain a pair or motion-sensing accelerometers, as described in our co-pending application U.S. Ser. No. 09/721,893.

With either tagging scheme, the tags function in cooperation with associated visual elements on the netpage as user interactive elements in that a user can interact with the printed page using an appropriate sensing device in order for tag data to be read by the sensing device and for an appropriate response to be generated in the netpage system.

Each application user interface flow is illustrated as a collection of documents linked by command arrows. A command arrow indicates that the target document is printed as a result of the user pressing the corresponding command button on the source page. Some command arrows are labeled with multiple commands separated by slashes ('/'s), indicating that any one of the specified commands causes the target document to be printed. Although multiple commands may label the same command arrow, they typically have different side-effects.

Figures 6, 7:
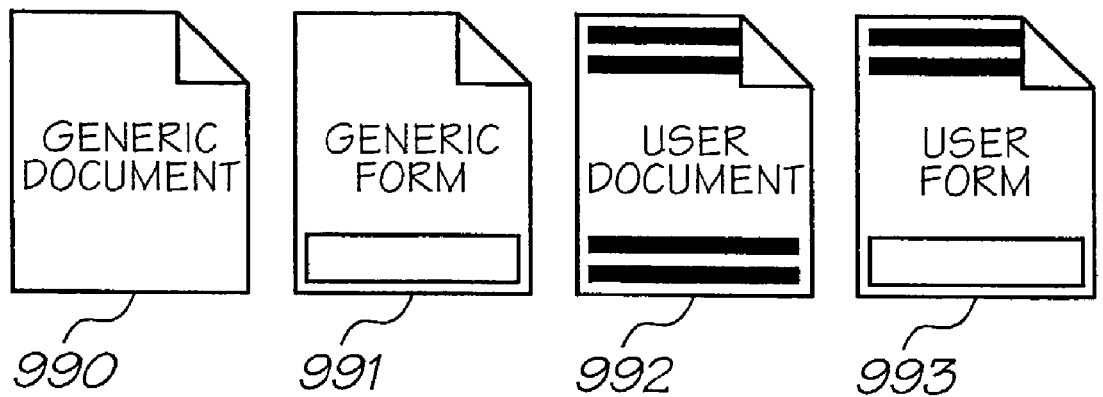
FIG. 6 is a schematic view of a set of user interface flow document icons.
FIG. 7 is a schematic view of a set of user interface page layout element icons.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 6 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 7, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Telephone Control Using the Netpage System

A netpage can be used to control a phone. The netpage can contain printed control buttons in the style of a telephone, or printed "call" buttons associated with contacts in a contact list or on a business card.

Commands generated by pen interactions with printed telephone controls can be sent directly from the netpage printer to the telephone device, by wired or wireless control interface, including radio (e.g. Bluetooth). Commands can also be sent to a business telephone system (e.g. a PABX system), or to a control node on a mobile telephony network.

In the case of a mobile telephone, the telephone can provide the pen with a data link to the netpage network, allowing pen interactions with a netpage to be resolved even while the pen is out-of-range of a printer. If the netpage sensor is built into the mobile telephone, then the need for pen-telephone communication is eliminated, and the user is able to dial a number by simply pressing on a printed "call" link with the telephone.

Controlling a phone via a netpage can have several advantages. Telephone numbers encountered in netpage-enabled print media such as magazines and business cards need no longer be manually dialed. A netpage-enabled address book entry can be used to automatically dial a number. Inexpensive phone user interfaces can proliferate. Since the phone user interface can be decoupled from the phone itself, the form factor of the phone need no longer be constrained by the need to provide a user interface as part of the phone, i.e. in the form of a keypad and/or display. Conversely, the phone user interface can be provided on the phone in the form of printed netpage phone controls. Phone controls can be customized by the user, both esthetically and functionally, and phone controls can be printed in combination with other device controls.

The following description illustrates the concepts of netpage telephone control in detail. Although specific reference is made to a netpage pen, any netpage sensing device can be used. A netpage 'thimble' sensing device worn on the tip of a finger, for example, may be particularly suited to interactive device and telephone control. Similarly, although specific reference is made to a netpage printer, any netpage base station can be used, i.e. any device which receives input from a netpage sensing device and either interprets the input directly or forwards the input to one or more network servers for interpretation. A suitably netpage-enabled mobile phone, or a suitably mobile-phone-enabled netpage pen, for example, can constitute an ideal mobile base station in many circumstances, particularly with the advent of third-generation 'always-on' packet-switched data connections.

Application Drawing Notation

Each application user interface flow is illustrated as a collection of documents linked by command arrows. A command arrow indicates that the target document is printed as a result of the user pressing the corresponding command button on the source page. Some command arrows are labelled with multiple commands separated by slashes ('/'s), indicating that any one of the specified commands causes the target document to be printed. Although multiple commands may label the same command arrow, they typically have different side-effects.

In application terms, it is important to distinguish between netpage documents and netpage forms. Documents contain printed information, as well as command buttons which can be pressed by the user to request further information or some other action. Forms, in addition to behaving like normal documents, also contain input fields which can be filled in by the user. They provide the system with a data input mechanism. It is also useful to distinguish between documents which contain generic information and documents which contain information specific to a particular interaction between the user and an application. Generic documents may be pre-printed publications such as magazines sold at news stands or advertising posters encountered in public places. Forms may also be pre-printed, including, for example, subscription forms encountered in pre-printed publications. They may, of course, also be generated on-the-fly by a netpage printer in response to user requests. User-specific documents and forms are normally generated on the fly by a netpage printer in response to user requests. FIG. 44 shows a generic document 990, a generic form 991, a user-specific document 992, and a user-specific form 993.

Netpages which participate in a user interface flow are further described by abstract page layouts. A page layout may contain various kinds of elements, each of which has a unique style to differentiate it from the others. As shown in FIG. 45, these include fixed information 994, variable information 995, input fields 996, command buttons 997, draggable commands 998, and text hyperlinks or hypertext links 999.

When a user interface flow is broken up into multiple diagrams, any document which is duplicated is shown with dashed outlines in all but the main diagram which defines it.

Telephone Control

The netpage system provides a mechanism for controlling telephone devices such as mobile telephones and fixed telephones.

A netpage can contain printed telephone control buttons in the style of a telephone keypad. Telephone controls can include digits (zero to nine), call, hangup, and last number redial.

In order for a phone to controlled remotely in this way, the phone must be registered for remote control with the netpage telephone control application.

Commands generated by pen interactions with printed phone control buttons can also be sent directly from the netpage printer to the telephone, by wired or wireless control interface, including infrared and radio (i.e. Bluetooth).

For phones with no ability to accept remote control commands, call requests can be sent by telephone control application to the phone's network provider. The phone network provide can place and connect the call on behalf of the user's phone.

In the netpage system, telephone control services are provided by one or more telephone control applications running on servers distributed on the network. User interactions with telephone control netpages are routed to the appropriate telephone control application via the appropriate page server using normal netpage mechanisms.

Figure 8:
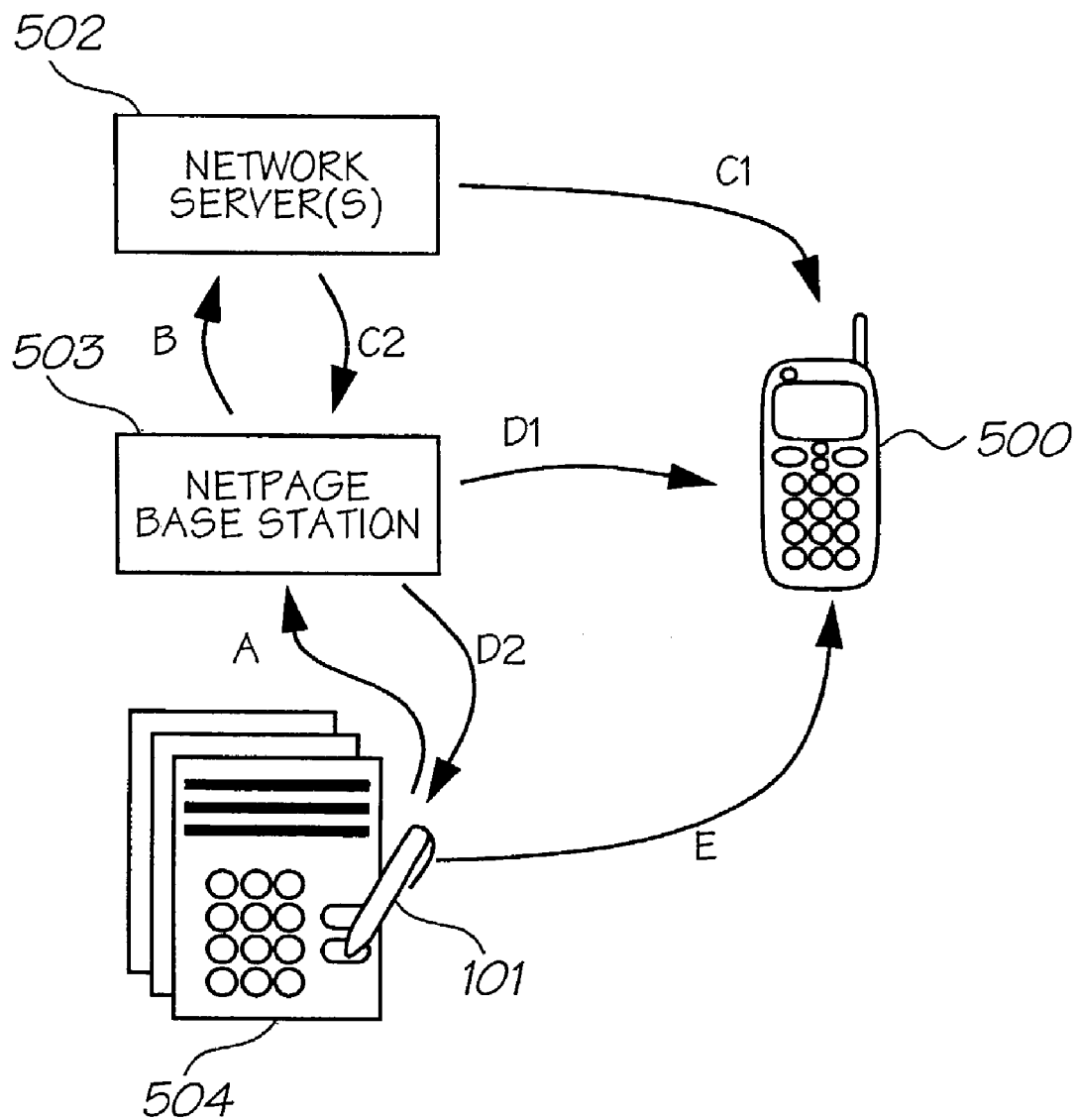
FIG. 8 is a schematic view of telephone control interactions.

Various telephone control interactions scenarios are illustrated in FIG. 8. When a user invokes a telephone function on the phone control netpage 504, the input is sent from the user's netpage pen 101 to the user's netpage printer or other base station 503 in the usual way (A). The input is relayed to the application 502 in the usual way (B). On receipt of the input, the application identifies the designated phone 500 and determines the specified phone command.

If the designated phone 500 is directly accessible to the application, then the application may send the command code directly to the device (C1) (or equivalently to a telephone system network node capable of controlling the device). This may be the case if the telephone is connected to a network accessible to the application, e.g. a telephone network provider. Otherwise the application may send the command code to the originating printer 503 (C2). The printer may be modified to be receptive to telephone control commands sent to it by a telephone control application.

If the designated telephone 500 is directly accessible to the printer 503, then the printer may send the command code directly to the telephone (D1). This may be the case if the telephone 500 is connected to a network accessible to the printer 503, e.g. a wired or wireless wide-area or local-area network, or if the printer 503 and telephone 500 can communicate directly by wire or wirelessly. Otherwise the printer 503 may send the command code to the originating pen 101 (D2).

The pen may be modified to be receptive to telephone control commands sent to it by a printer. The pen may transmit the command code to the phone via its radio (e.g. Bluetooth) transmitter, or it may be augmented with an infrared transmitter for this purpose. In the latter case, the pen's infrared transmitter must be in line of sight of the telephone's infrared receiver.

Telephone Control Object Model

The phone control object model revolves around user phones and phone remote controls.

Figure 9:
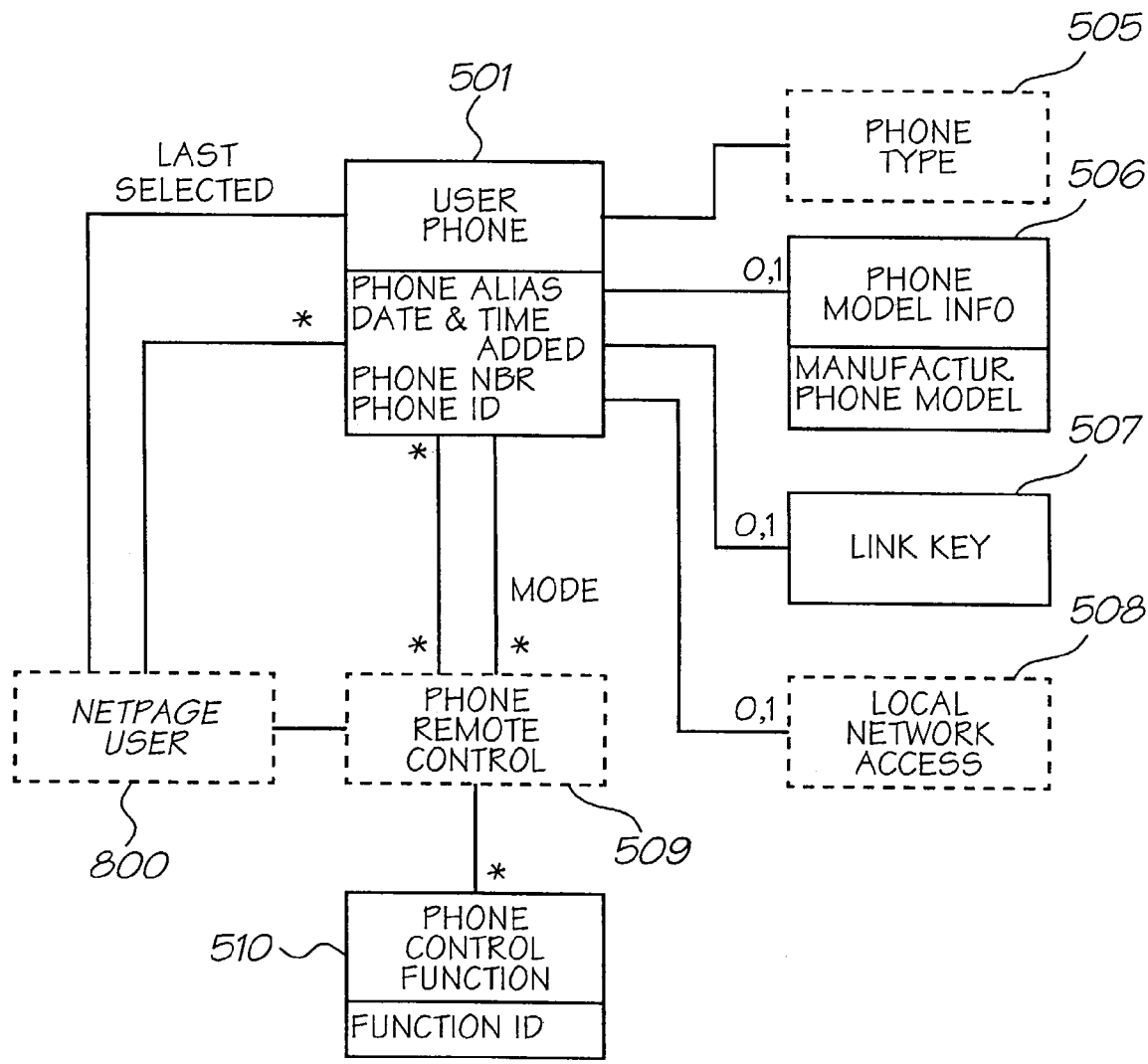
FIG. 9 is a schematic view of a user phone class diagram.
Figure 10:
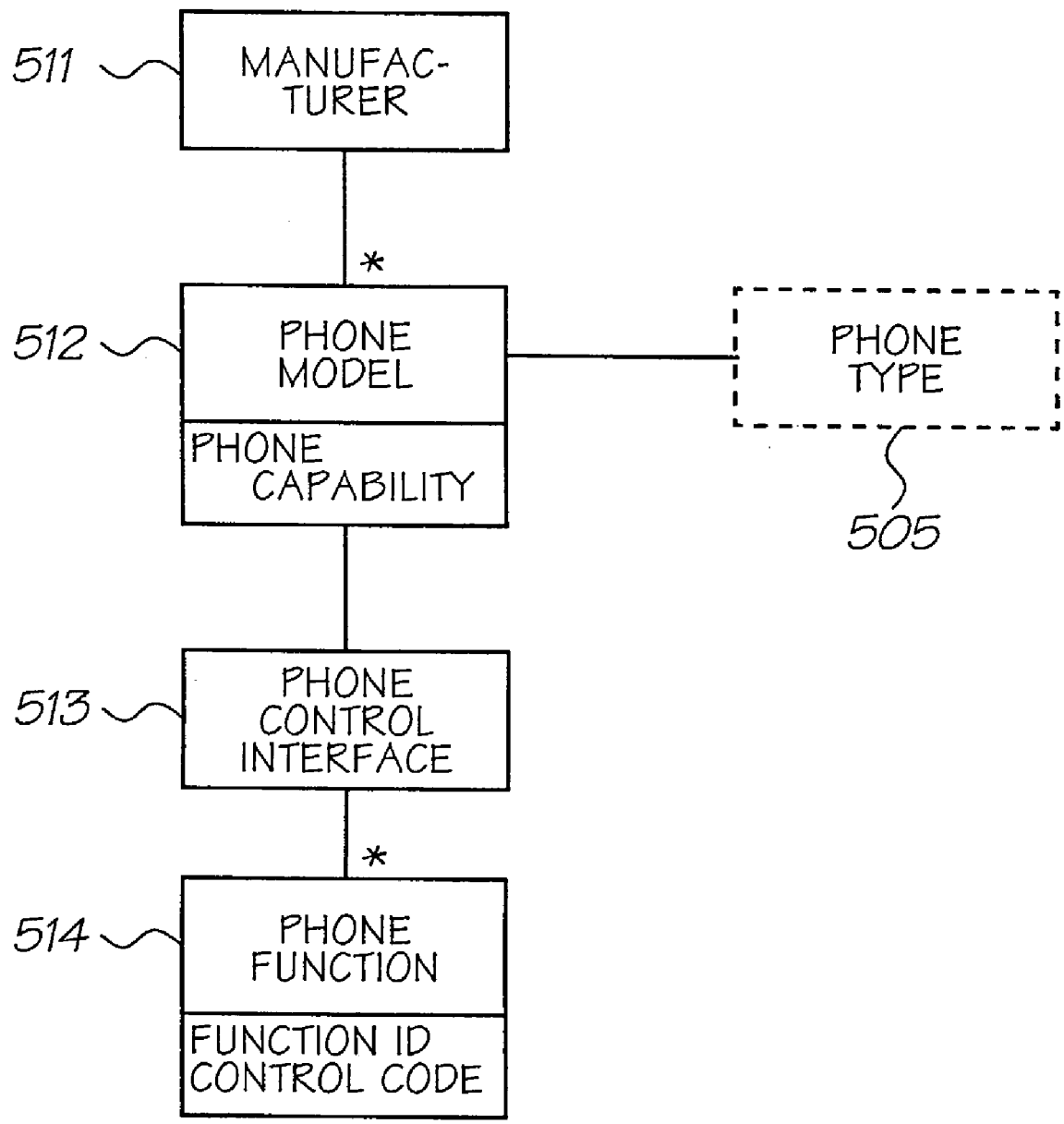
FIG. 10 is a schematic view of a phone information class diagram.

Each netpage user 800 has one or more registered user phones 501. Each user phone 501 has a phone alias name assigned by the user, the date and time the phone was added, the phone number, the unique phone identifier, and an indicator of whether the phone provides local network access 508 (e.g. has a short range radio transceiver or infrared receiver). Each user phone 501 may have phone model information 506 associated with it, comprising the manufacturer and the phone model. Each user phone 501 may have a link key 507 associated with it. This is the link key 507 used to authenticate a connection between a device through which the telephone control application is acting and the corresponding phone, when a trusted relationship has previously been established. The user phone class diagram is shown in FIGS. 9 and 10.

Figure 13:
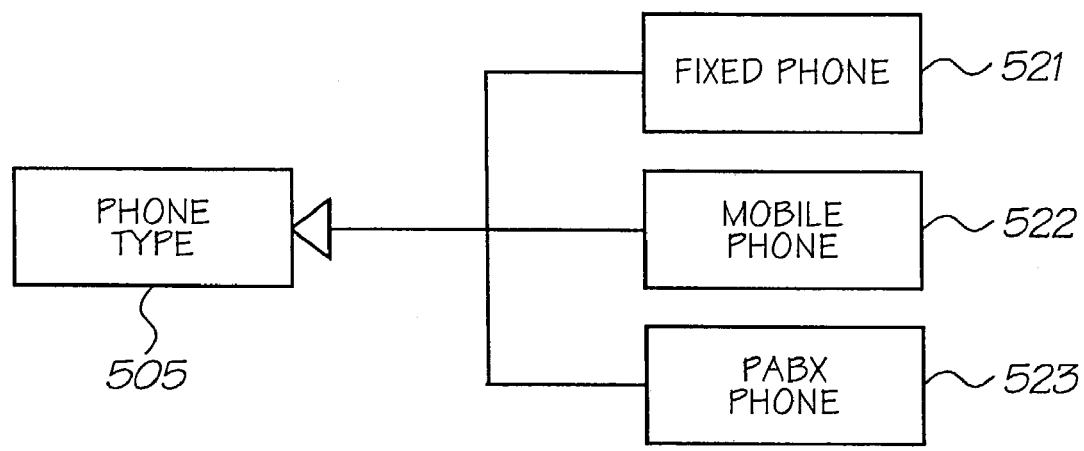
FIG. 13 is a schematic view of a phone type class diagram.

Each user phone 501 has a phone type 505. The type can indicate a fixed phone 521, a mobile phone 522, or a PABX (or other type of business phone system) phone 523. The phone type class diagram is shown in FIG. 13.

Figure 11:
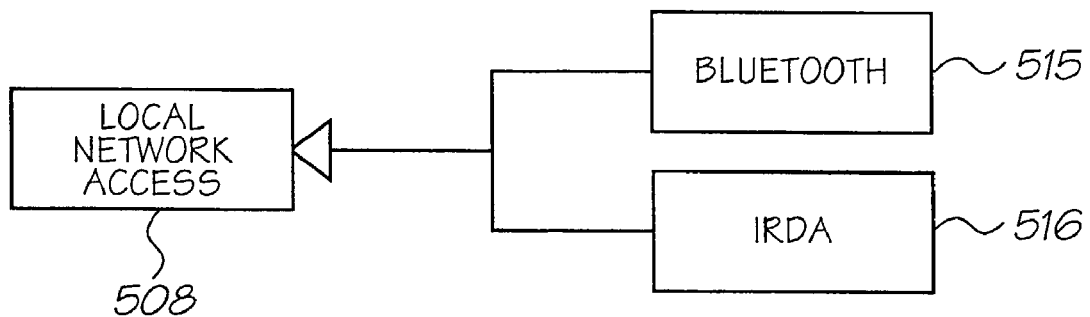
FIG. 11 is a schematic view of a local network access class diagram.

A phone 500 may provide local network access, for example via infrared or radio. There are a variety of standard (and de facto standard) local-area and personal-area wireless (WLAN and WPAN) protocols which a phone may utilize to provide local network access, for example via infrared or radio. These protocols include IEEE 802.11 (see the IEEE 802.11 Standard, the contents of which are herein incorporated by reference), IEEE 802.15/Bluetooth (see L M Ericsson et al., Specification of the Bluetooth System, Volume 1: Core, and Volume 2: Profiles, v1.0 B, December 1999, the contents of which are herein incorporated by reference), HomeRF/SWAP and IrDA. For illustration purposes, Bluetooth and IrDA are used where appropriate in the description that follows as examples of radio and infrared protocols respectively. The local network access class diagram is shown in FIG. 11.

Each netpage user 800 has a last selected user phone. This is the phone most recently selected by the user, and is the phone to which remote control commands are sent by default.

Figure 14:
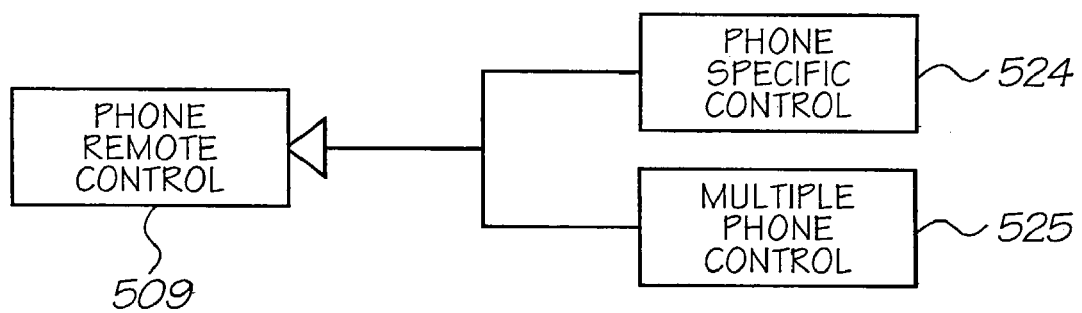
FIG. 14 is a schematic view of a phone remote control class diagram.

Each phone user 501 can have a number of phone remote controls 509. A phone remote control 509 has a number of phone control functions 510 associated with it, each with a function identifier. The function identifier is used to look up the control code for the function 514 from the manufacturer 511. A phone remote control 509 may be phone-specific 524, or may be a multi-phone remote control 525 (i.e. used to control more than one phone). The phone control class diagram is shown in FIG. 14.

A phone-specific remote control only operates the phone for which it was printed. A multi-phone remote control may operate several phones. The user selects a phone on the phone remote controls to indicate which phone is current.

Each manufacturer 511 may have a number of phone models 512. Each phone model 512 has a phone type 505, and has information about the phone's capabilities, including its ability to be remotely controlled, and whether it provides local network access. If a phone has the ability to be controlled remotely it has associated with it a phone control interface 513, which contains information about the remote control phone functions 514 available. Each phone function 514 has a function identifier and the control code to perform the function. The phone information class diagram is shown in FIG. 10.

Figure 12:
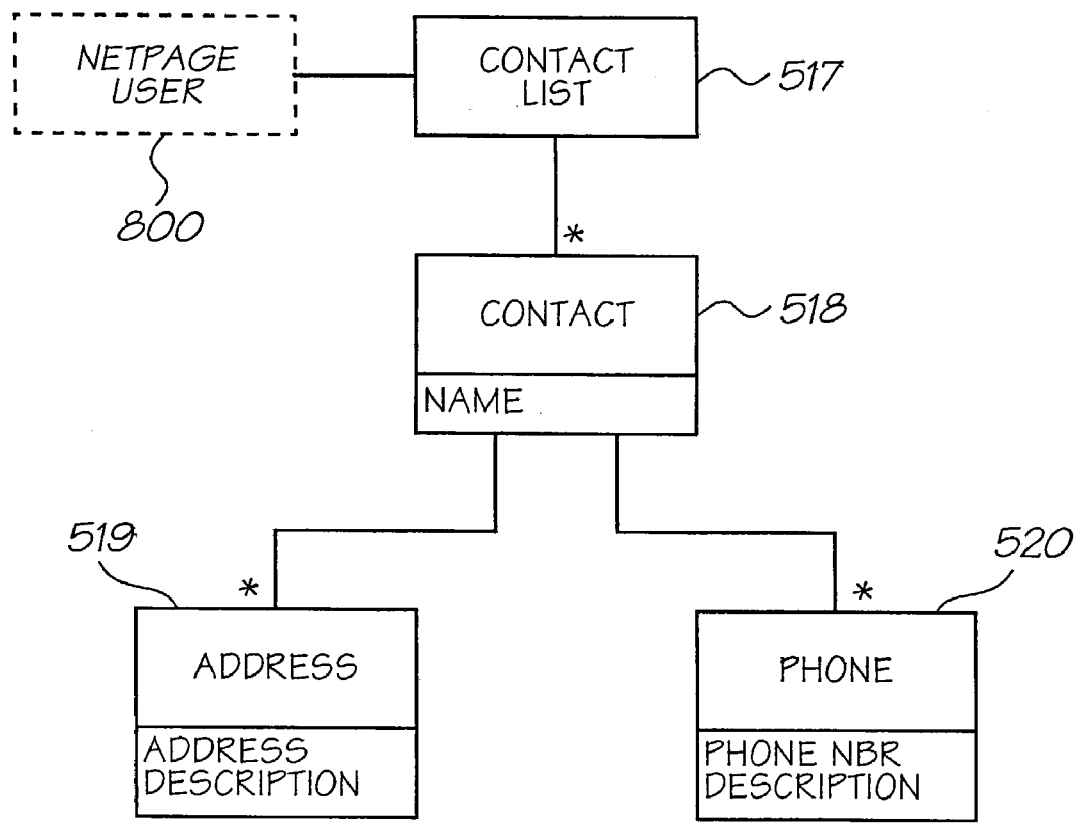
FIG. 12 is a schematic view of a contact list class diagram.

Each netpage user 800 has a contact list 517 comprising a number of contacts 518. Each contact 518 has a name, and may be a number of addresses 519 and a number of phone numbers 520. Each contact address 519 has the address text and a description (e.g. home, business, etc.). Each contact phone number 520 has a phone number and a description (e.g. home, business, mobile, fax, etc.). The contact list diagram is shown at FIG. 12.

Telephone Control User Interface

The user typically obtains the netpage user phone list 527 main page from the user's contact list 529. Alternatively the user obtains the page from the phone control application's entry in the netpage system application catalogue, obtained via the netpage printer's help page. The user may also bookmark the page and subsequently obtain it via their favorites list, or obtain it via their history list.

Figure 19:
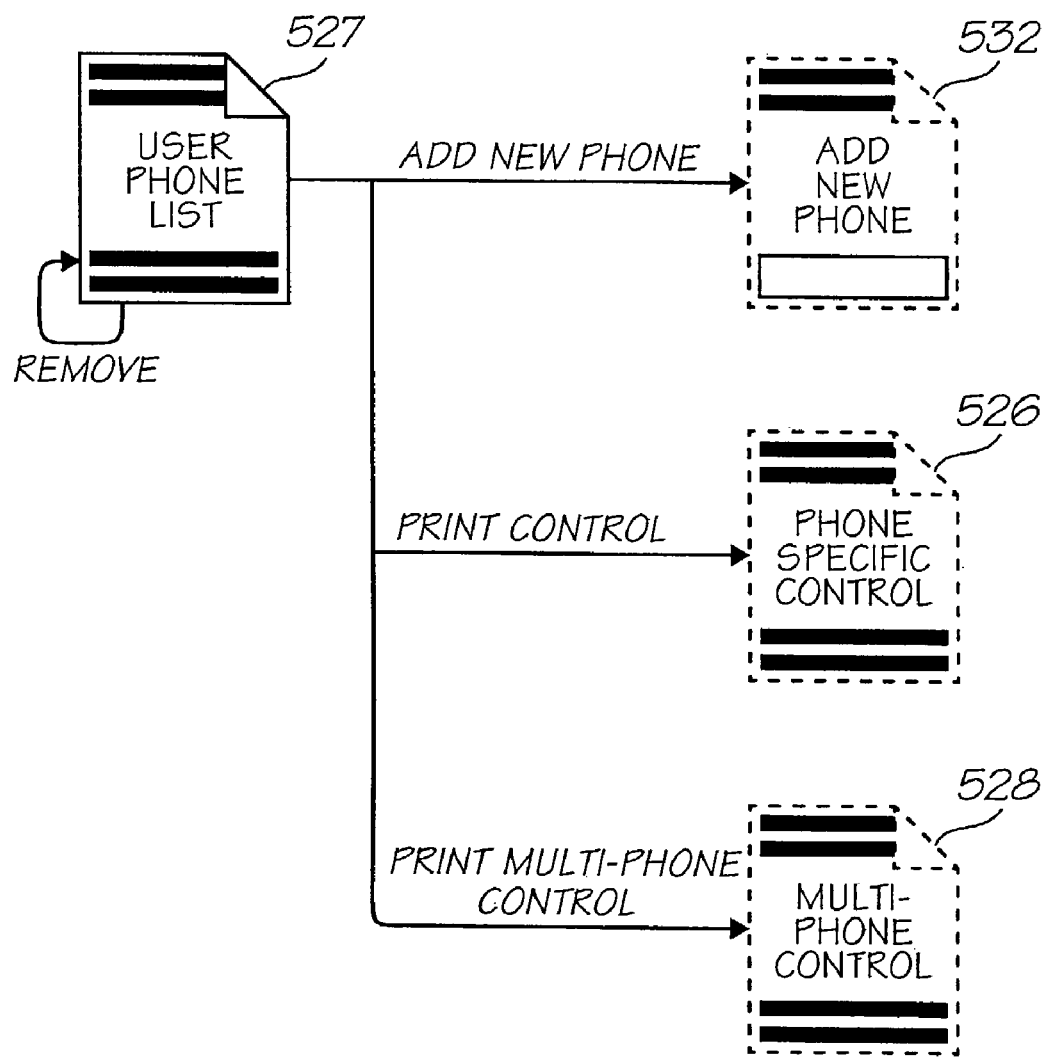
FIG. 19 is a schematic view of a phone control user interface flow.

The phone control user interface flow is shown in FIG. 19.

Remotely Controlling a Phone

Once a phone is registered for remote control, the user can control the phone by pressing printed netpage control buttons.

Contact List

Figure 21:
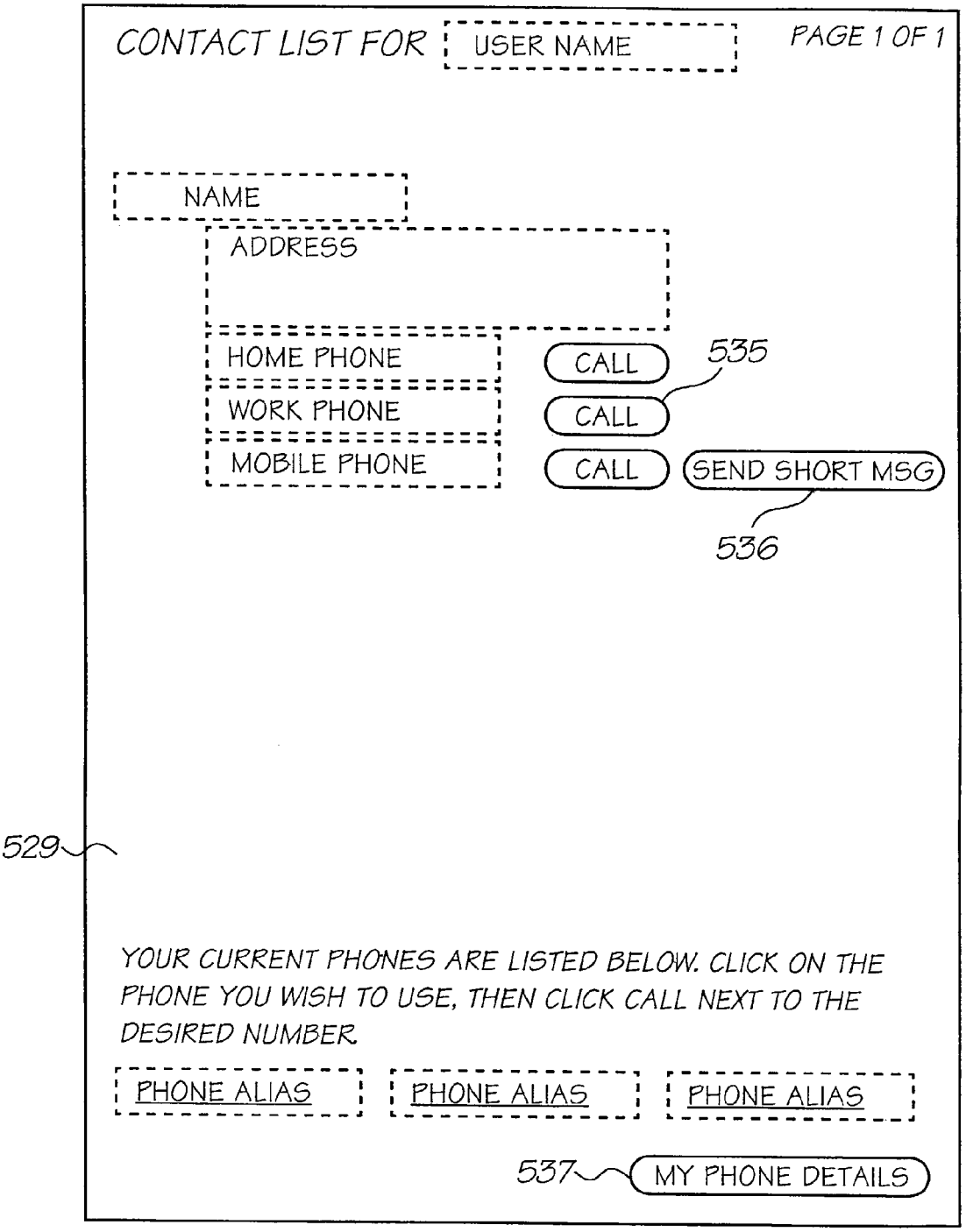
FIG. 21 is a schematic view of a contact list.

The user's contact list 529, shown in FIG. 21, gives telephone numbers for each contact. The user presses the <Call> button 535 beside a telephone number to cause their last selected phone to dial the number.

As an alternative to immediately dialing the number, the telephone control application may transmit the phone number to the phone without causing the number to be dialed.

As another alternative, the telephone control application may cause the phone to ring. When the user answers the phone the selected number is then automatically dialed and the call connected. This allows the user to verify that they are using the correct phone.

Figure 22:
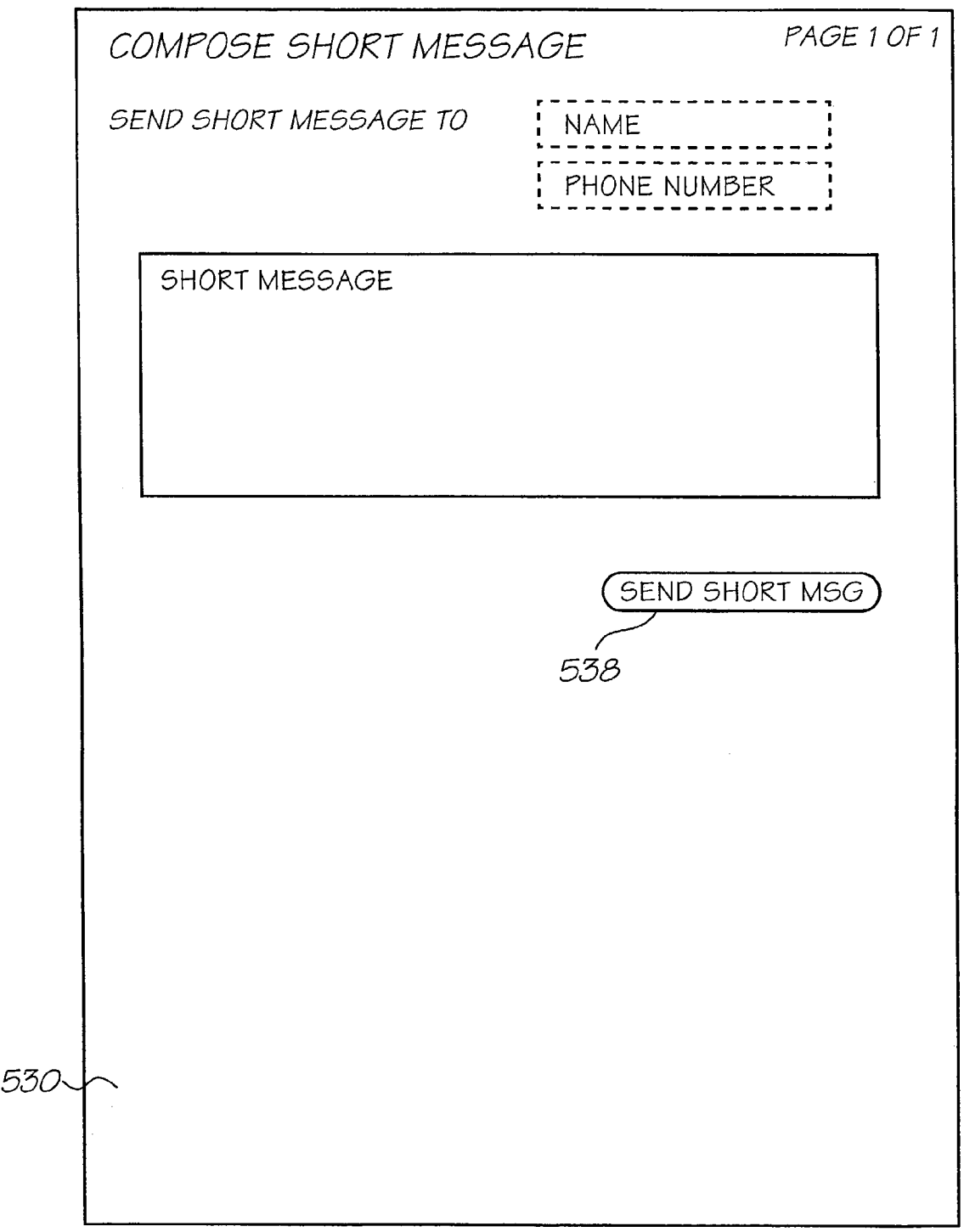
FIG. 22 is a schematic view of a compose short message interface.

The user presses the <Send Short Message> button 536 to compose a short text message to be sent to the contact's chosen phone. A compose short message page 530 is printed, as shown in FIG. 22.

A button for each of the user's registered phones is shown at the bottom of the contact list 529. The button is labeled with the phone alias specified by the user when the phone was registered. The user presses a phone selection button to make the phone current. Any remote control commands subsequently invoked are sent to this phone.

Figure 24:
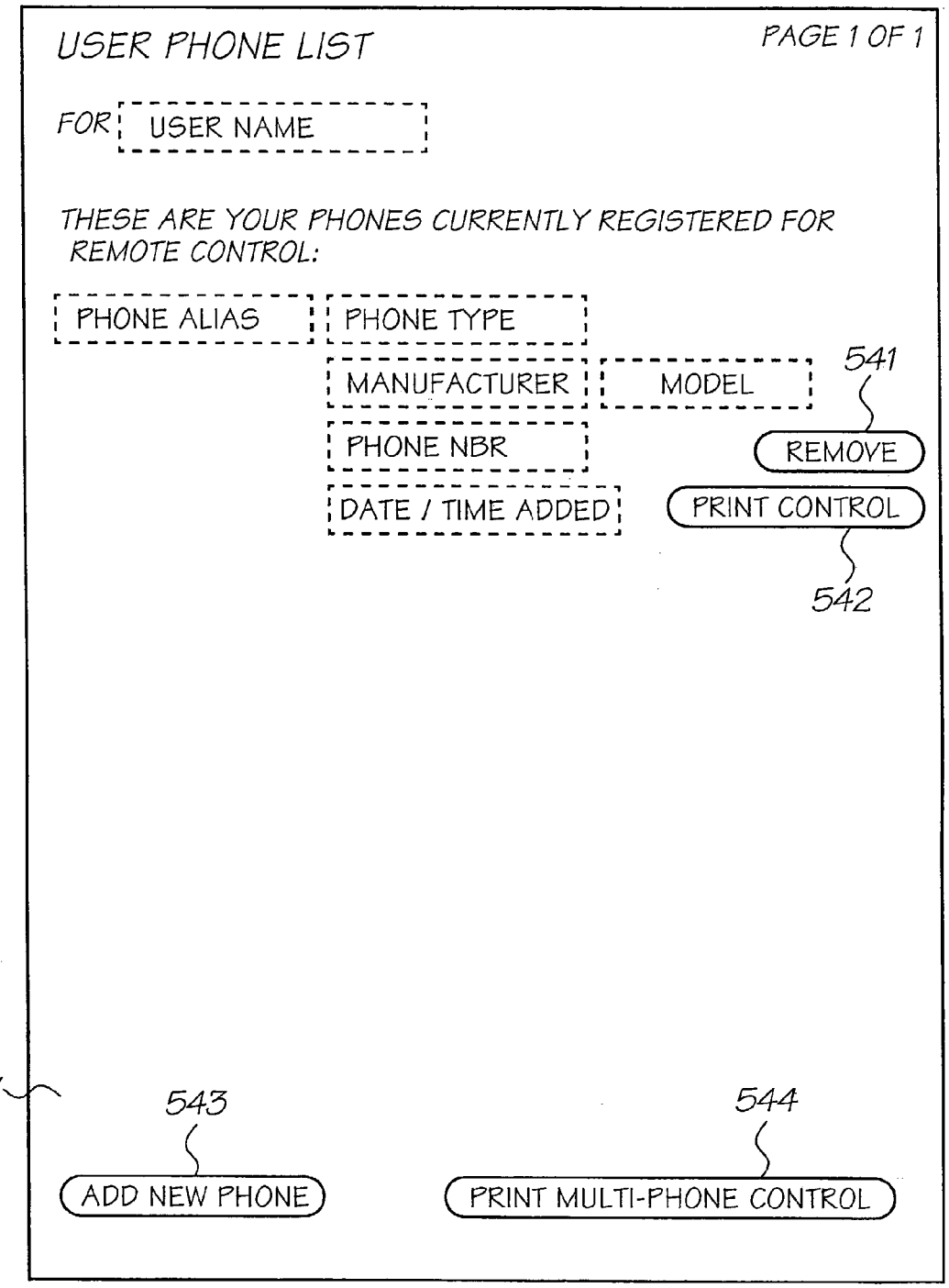
FIG. 24 is a schematic view of a user phone list.

If the user presses the <My Phone Details> button 537, a user phone list page 527 is printed, as shown in FIG. 24.

Figure 17:
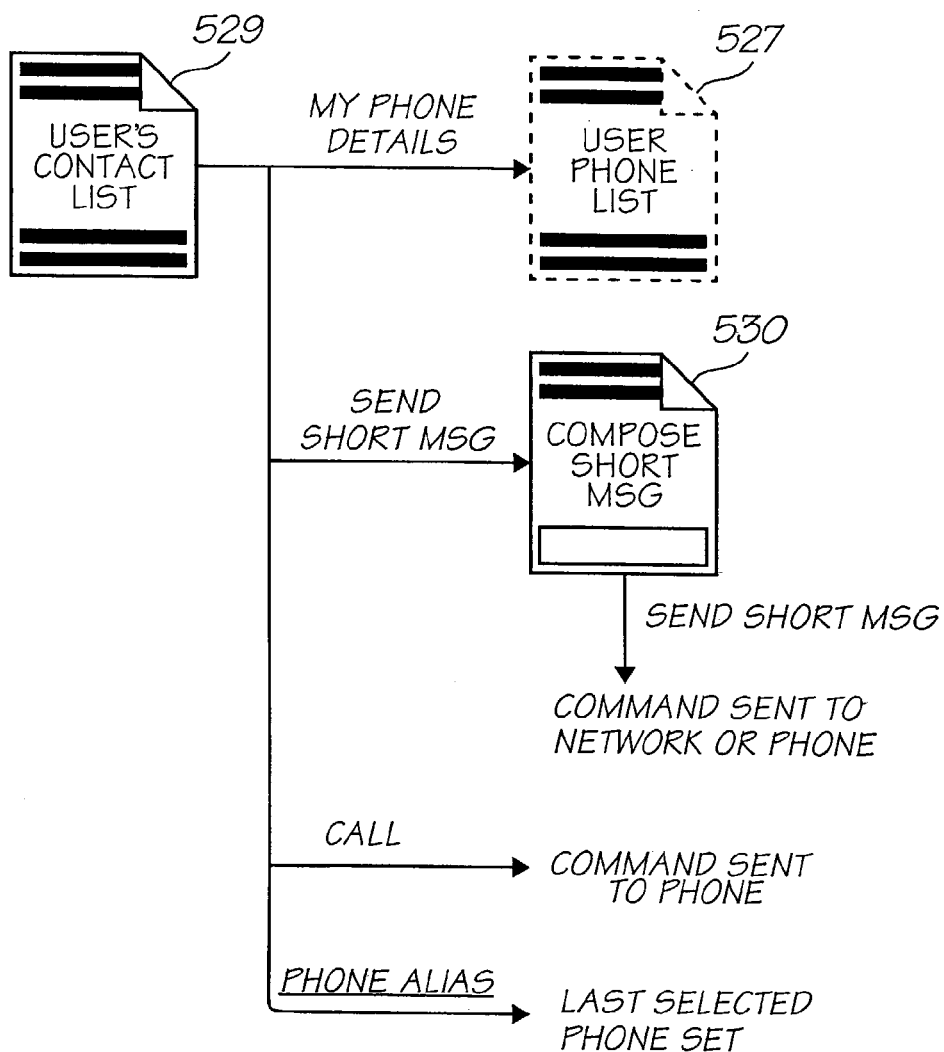
FIG. 17 is a schematic view of a contact list user interface flow.

The contact list user interface flow is shown in FIG. 17.

This system, as described, makes not explicit provision for numbers internal to a private phone system (e.g. extensions on a PBX/PABX). However, it can be trivially extended to do so by recording, for each number in a contact list, whether it is associated with a particular private phone system.

Because the netpage printer or other base station through which the user interacts with the telephone control application has a known geographic location recorded by the netpage registration server, the telephone control application can correctly route non-local calls initiated by roaming users.

If the roaming user's mobile phone is acting as the netpage base station, then the mobile network is able to inform the netpage system of the phone's approximate geographic location.

For the purposes of roaming, phone numbers can be stored fully qualified, i.e. with non-local prefixes, in the user's contact list, and the telephone control application can strip these off as appropriate for regional or local calls. Alternatively, explicit geographic regions or locations can be associated with phone entries.

Compose Short Messages

The user can send a short message to a contact's chosen phone by pressing the <Send Short Message> button 536 on the contact list 529 (FIG. 22). A compose short message form 530 (FIG. 22) is printed.

The contact's name and phone number as shown at the top of the page. The user writes the short message and presses the <Send Short Msg> button 538. Netpage converts the message to text using online handwriting recognition, and sends the short message to the phone via the phone's network provider.

Business Card

Figure 23:
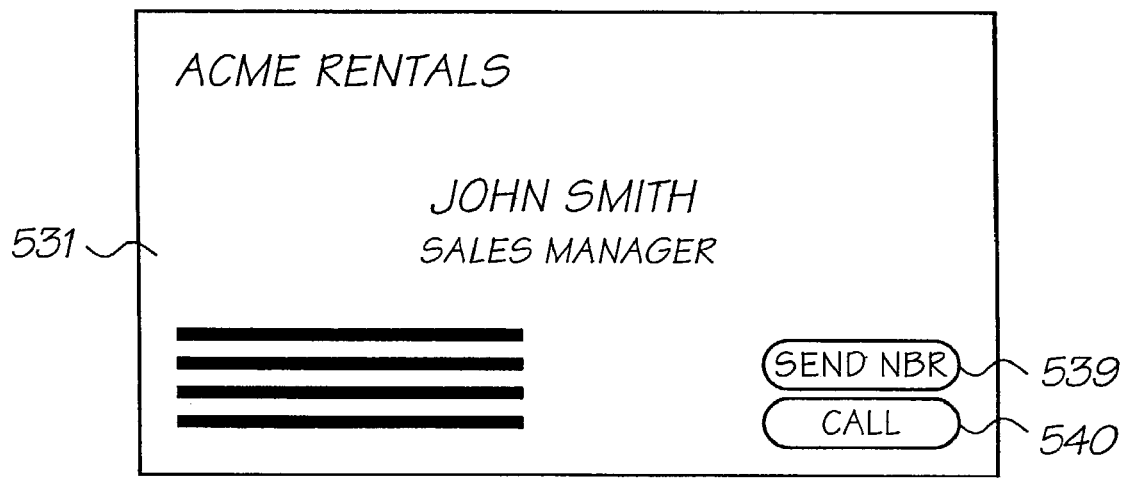
FIG. 23 is a schematic view of a sample business card.

A person's business card 531 can be printed with netpage buttons. An example of this is shown in FIG. 23. The user (recipient of the business card) presses the <Call> button 540 on the business card. The telephone control application causes the user's last selected phone to dial the phone number on the business card.

The business card may contain a <Send Nbr> button 539. When the user presses this button the phone number is sent to the user's phone, but the number is not dialed. This facilitates the user saving the phone number to their phone's memory. Alternatively, the number could be sent to any other appropriately enabled device, such as a personal organizer.

Figure 18:
FIG. 18 is a schematic view of a business card user interface flow.

The business card user interface flow is shown in FIG. 18.

Other buttons which would typically appear on a netpage business card are not shown here for clarity, but examples are described in our co-pending application U.S. Ser. No. 09/663,579.

Similarly printed netpage phone control buttons can be printed on any document, such as advertisements, telephone directories, etc.

As an alternative, phone number information may be embedded directly in the netpage tags on a business card or document. This information can be interpreted directly in the pen or by the base station and used to send control commands directly from the netpage pen or base station to the phone.

Phone Remote Control

Figure 27:
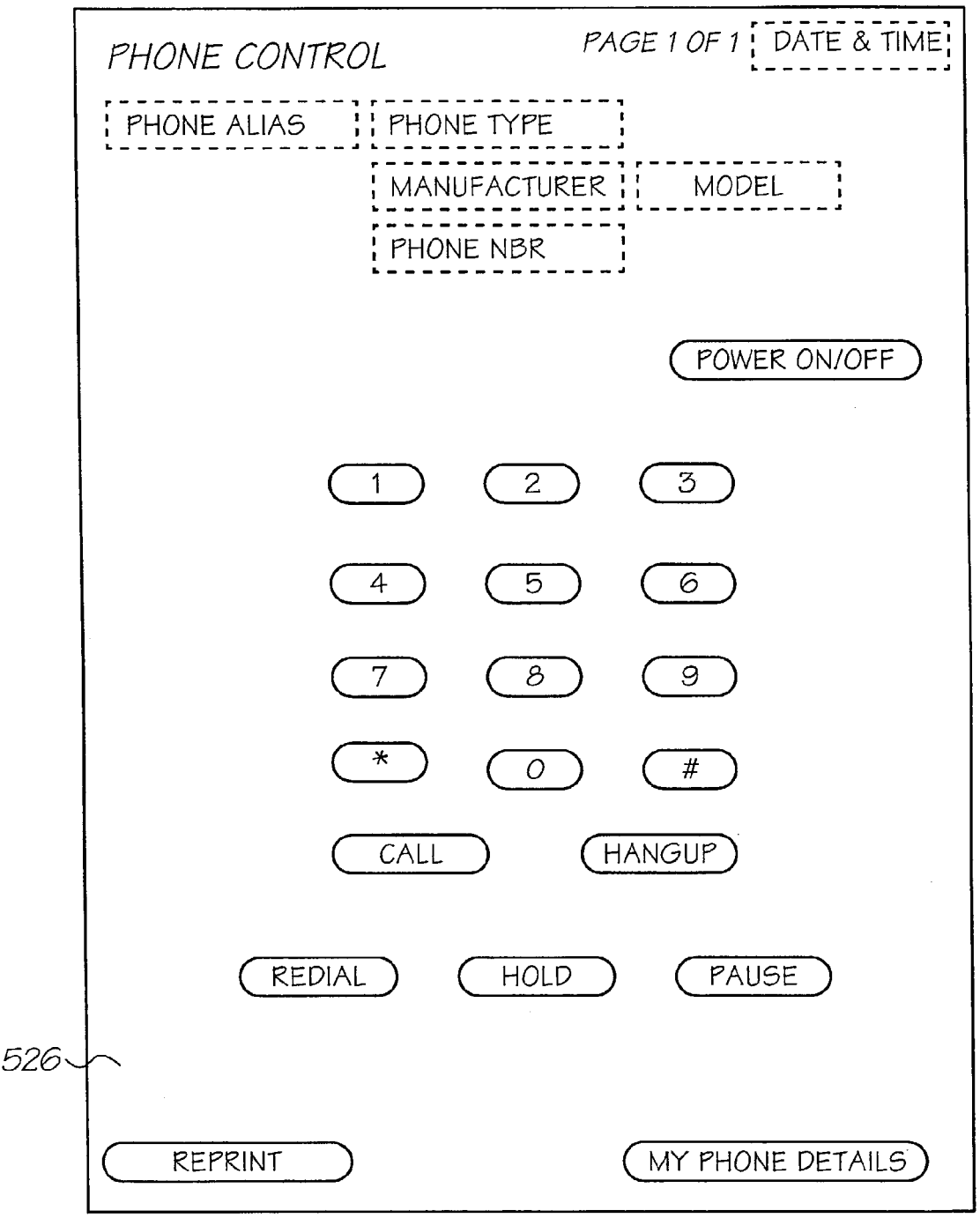
FIG. 27 is a schematic view of a phone-specific control.
Figure 28:
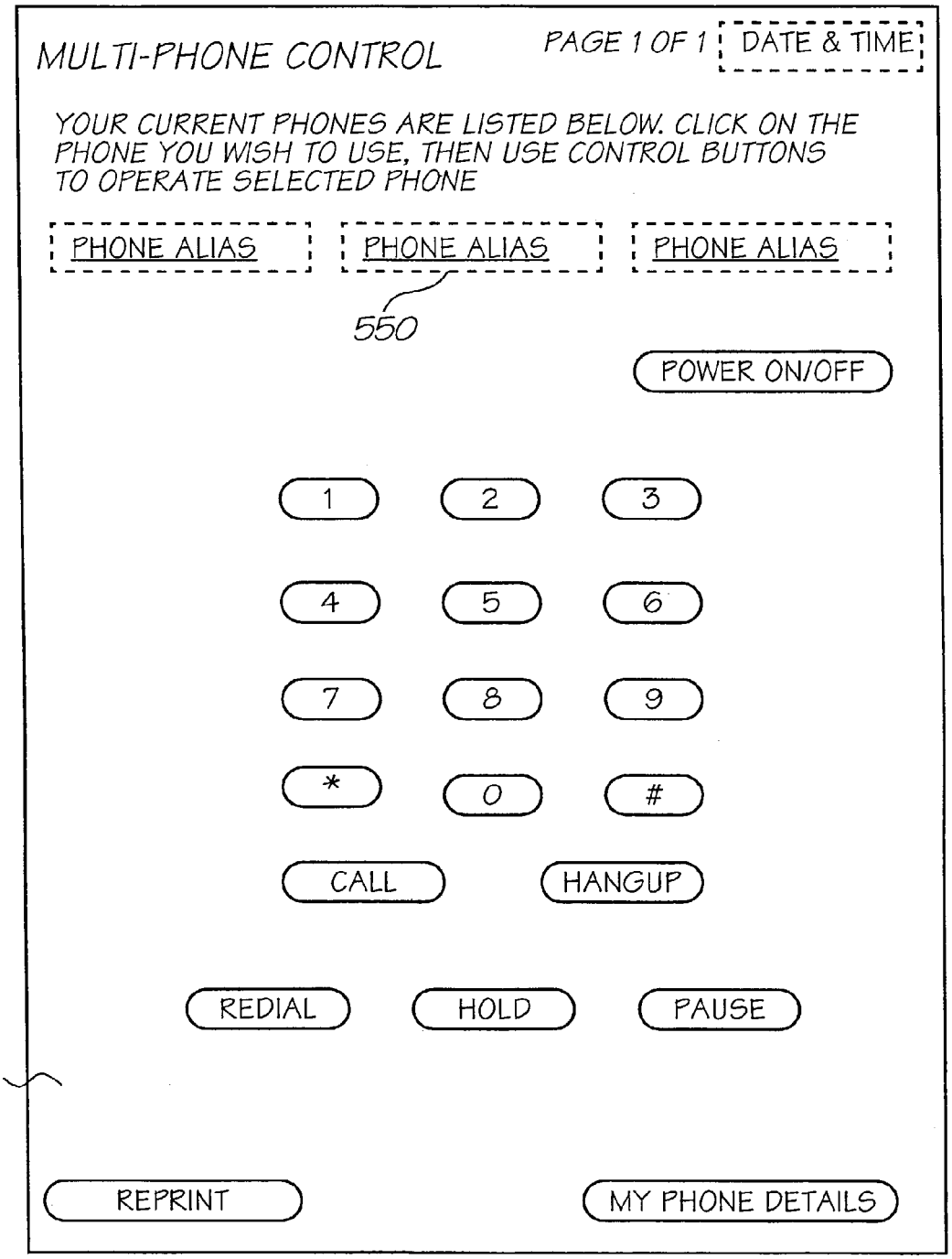
FIG. 28 is a schematic view of a multi-phone control.

There are two kinds of phone remote control, the phone-specific remote control 526 and the multi-phone remote control 528. Phone-specific and multi-phone remote controls are both typically printed on demand by the user. An example of a phone-specific remote control 526 is shown in FIG. 27. An example of a multi-phone control 528 is shown in FIG. 28.

The appearance and function of a remote control may depend on the phone type, model, manufacturer, etc. A manufacturer may provide their own netpage remote control which can be pre-printed, or printed by the user on demand.

When the user presses a remote control button on a multi-phone remote control 528, the telephone control application looks up the last selected phone for the user. The phone being controlled by a multi-remote control 528 is determined by the last selected phone for the user. This may be set when a phone alias button 550 is pressed on the control.

A phone-specific remote control 526 is associated with a single user phone. Thus, when the user presses a remote control button on a phone-specific or multi-phone remote control, the phone alias name, and therefore the desired user phone, is known.

Figure 15:
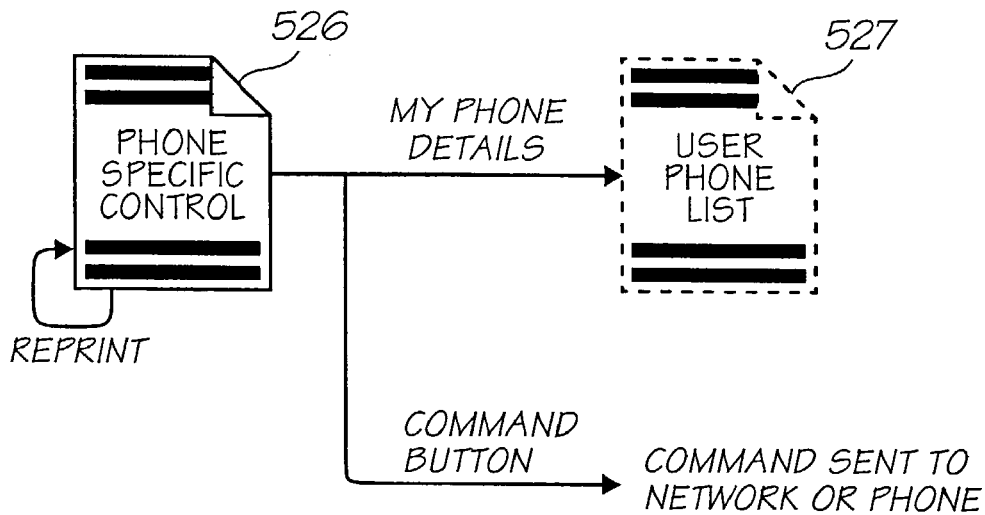
FIG. 15 is a schematic view of a phone-specific remote control user interface flow.
Figure 16:
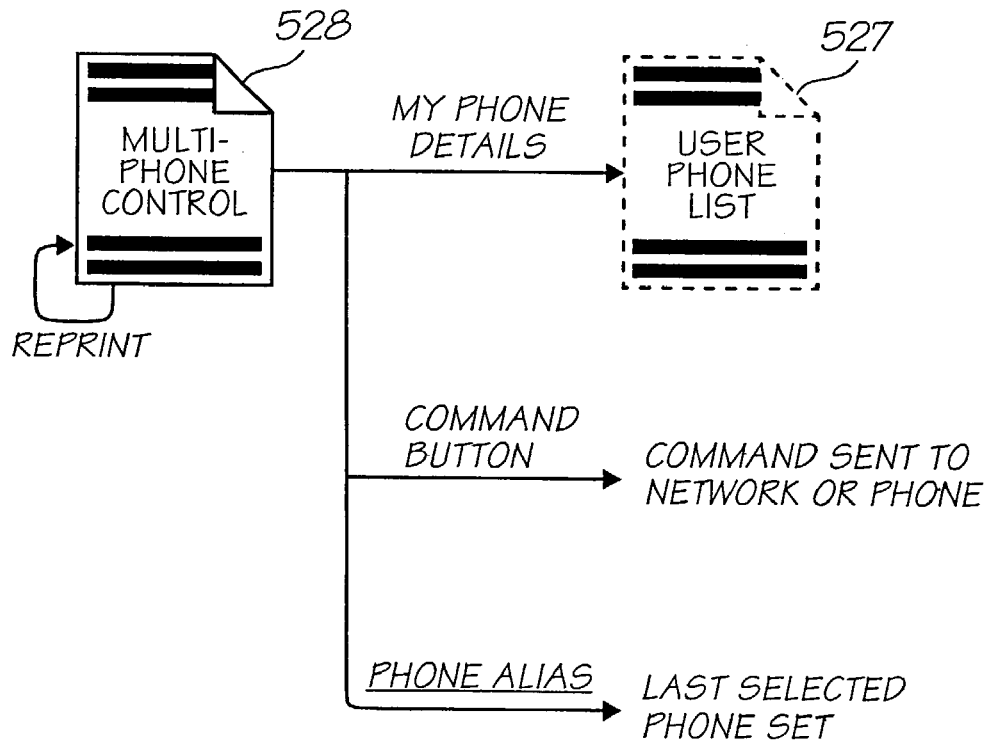
FIG. 16 is a schematic view of a multi-phone remote control user interface flow.

The phone-specific remote control user interface flow is shown in FIG. 15. The multi-phone remote control user interface flow is shown in FIG. 16.

A remote control button is associated with a remote control function 510, which has a unique function identifier (e.g. unique within the phone model). When the user invokes a remote control function 510, the phone control application looks up the phone model 512 in the manufacturer's database to find the phone function 514 control code for the required function identifier. It then transmits the control code to the phone or phone network node, or otherwise uses the control code to invoke the appropriate function on the phone.

Alternatively, the required phone control command may be embedded within the netpage tags of a netpage button. In this case, the application does not need to look up the manufacturer's database.

Control Command Transmission

The method of transmission for telephone control commands may vary depending on the phone's capability and the user's pen.

A phone with no ability to accept remote control commands can be connected to requested calls by the phone network provider. When the user initiates a call using netpage control buttons, the telephone control application sends the request to the phone network provider. The user's phone rings and when the user answers the phone, the requested call is initiated by the network provider. A synthesized voice message may tell the user the number being dialed. The user can immediately hang up to cancel the call request or hold the line while the number is being dialed.

A phone with remote control capabilities but no wireless control interface can be sent remote control commands by a wired connection. If the netpage printer has a direct wired connection to the phone (or PBX/PABX system), remote control commands can be sent directly to the phone. If there is no direct connection to a fixed or PBX/PABX phone, the telephone control application can send remote control commands via the phone network provider.

For a mobile phone, remote commands can be sent via the phone's mobile phone network provider. A call may be placed by the network provider on behalf of the phone.

The netpage pen can be augmented to work as an infrared remote control. If the phone is infrared enabled then remote commands can be sent directly from the netpage pen to the user's phone. Alternatively, infrared remote commands can be sent from the netpage printer to the phone.

Remote commands can be sent directly from the netpage printer or other base station to the phone by some other wireless connection, such as Bluetooth. When the user presses a netpage phone control button, a Bluetooth connection to the phone is established using the stored link key. The telephone control application determines the appropriate remote control command, and the command is sent direction from the printer (or pen) to the phone.

User Phone List

The user phone list 527 main page, shown in FIG. 24, lists the phones registered for remote control by a particular netpage user. Listed for each registered phone is the phone alias, phone type, manufacturer (if known), model (if known), phone number, and the date and time the phone was registered.

To remove the phone from the list, so that it is not longer registered for remote control, the user presses the <Remove> button 541. An updated user phone list is printed.

To print a remote control for a specific phone the user presses the <Print Control> button 542. A phone-specific control page 526 is printed, an example of which is shown in FIG. 27. To print a multi-phone remote control the user presses the <Print Multi-Phone Control> button 544. A multi-phone control page 528 is printed, an example of which is shown in FIG. 28.

To register a new phone for remote control the user presses the <Add New Phone> button 543. An add new phone form 532 is printed, as shown in FIG. 25.

Figure 20:
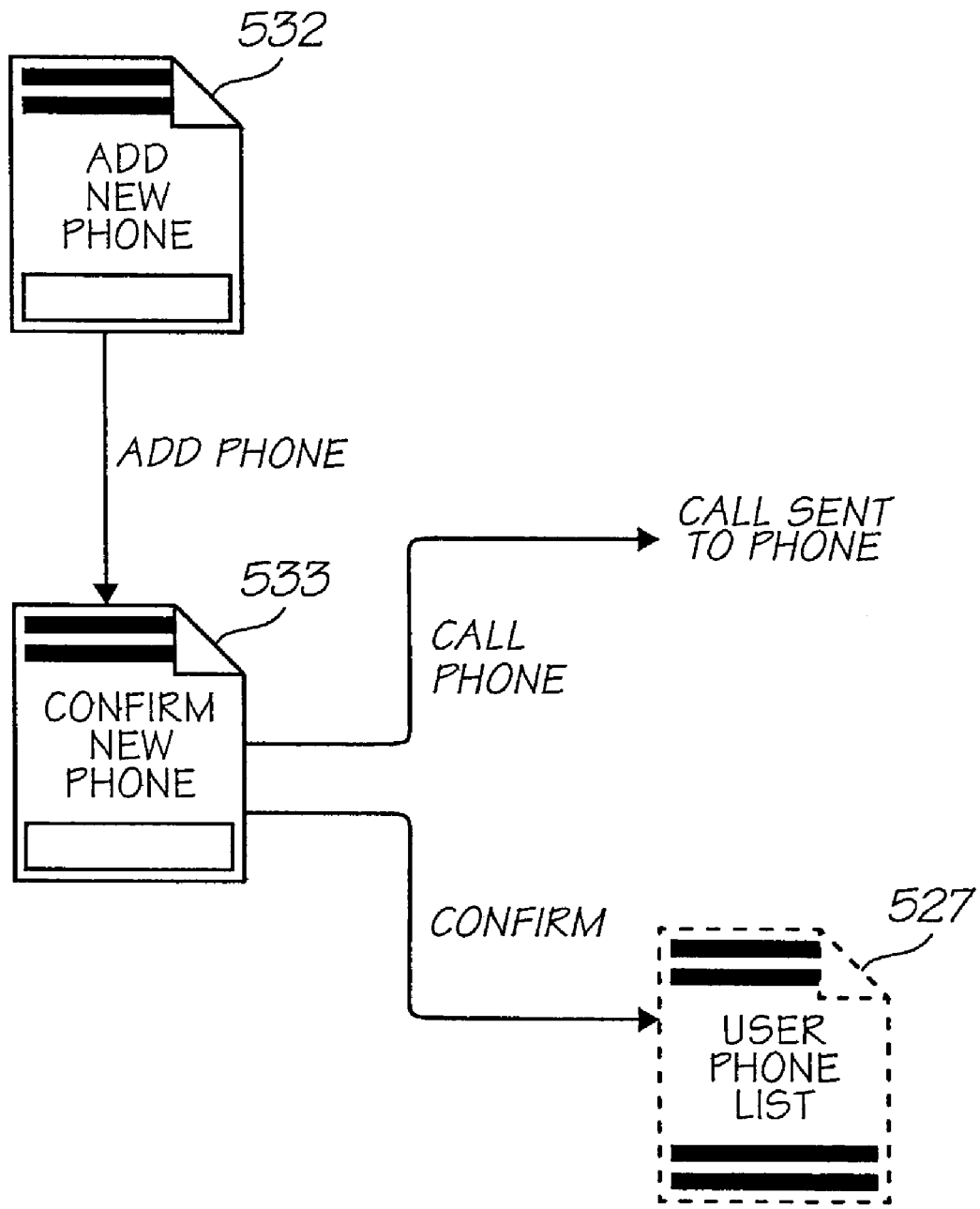
FIG. 20 is a schematic view of a new phone set up user interface flow.

The new phone setup user interface flow is shown in FIG. 20.

Adding a New Phone

A new phone can be registered for remote control using the add new phone form 532 (FIG. 25). This form is printed by pressing the <Add New Phone> button 543 on the user phone list page 527 (FIG. 24). Adding a new phone may also be initiated on the telephone. The telephone then communicates with the netpage printer (or telephone control application) causing an add new phone form 532 to be printed.

If the phone being registered for remote control is an "intelligent" phone which knows about remote control registration, the user selects the remote control registration option on the phone's user interface. The phone (or phone system) generates a registration passkey. The passkey is typically single-use and has a short life span; it may, for example, only be valid for 30 minutes. The passkey is displayed on the phone's screen, and the user manually transfers it to the appropriate field of the add new phone form 532. The entered passkey 547, once submitted to the netpage phone control application, is subsequently passed back to the phone (or phone system) by the phone control application. The phone (or phone system) uses the passkey to authenticate the phone control application, i.e. the phone (or phone system) chooses to trust the phone control application on the basis of the proffered passkey because the user, who is the nominal owner of the phone, has demonstrated their trust in the pone control application by supplying the application with the passkey. The remote control registration option on the phone can itself be password-protected to prevent access by casual users.

If the phone is not "intelligent" and cannot generate a passkey, the user can call a remote-control registration service. This services provides either an automated voice response system or a human operator. The user provides some proof of identity, and information about the phone to be registered, and is given a registration passkey.

On the add new phone form 532, the user specifies a phone alias 545 and the phone number 546 for the phone being added. The user indicates if the phone is a fixed phone, a mobile phone, or a PABX phone by marking the appropriate check box. The user indicates if the phone has local network access by checking either the Bluetooth checkbox or the IrDA checkbox. Finally the user enters the registration passkey 547 obtained from the phone or the registration service.

The user signs the form and presses the <Add Phone> button. A confirm new phone details page 533 is printed, as shown in FIG. 26. If possible the phone registration application obtains the manufacturer and model information from the phone.

If the phone details are correct, the user presses the <Call Phone> button 548. The selected phone rings once to confirm to the user that this is the correct phone. The user then presses the <Confirm> button 549 to finalize the phone registration. An updated user phone list 527 is printed, as shown in FIG. 24.

If the phone is Bluetooth-enabled the Bluetooth bonding process takes place between the phone and the netpage device (pen or printer), whereby a trusted relationship is established between the two devices on the basis of the netpage device providing the phone with the correct passkey. During the bonding process a link key is generated which is stored by or on behalf of both devices, and used for authentication during future interactions between the two devices.

The new phone setup user interface flow is shown in FIG. 20

CONCLUSION

The present invention has been described with reference to a preferred embodiment and number of specific alternative embodiments. However, it will be appreciated by those skilled in the relevant fields that a number of other embodiments, differing from those specifically described, will also fall within the spirit and scope of the present invention. Accordingly, it will be understood that the invention is not intended to be limited to the specific embodiments described in the present specification, including documents incorporated by cross-reference as appropriate. The scope of the invention is only limited by the attached claims.

The invention claimed is:

1. A system for enabling at least one function of a telephone to be controlled, the telephone being operative to perform the at least one function in response to at least one command, the system including:
   a control interface containing information relating to the at least one function, the control interface including coded data indicative of an identity of the control interface and of at least one reference point of the control interface, the coded data comprising a plurality of substantially undifferentiated marks positioned relative to a set of predetermined nominal mark positions; and
   a netpage printer operative to receive indicating data from a sensing device for effecting at least one operation relating to the at least one command, the indicating data being indicative of the identity of the control interface and at least one of a position and a movement of the sensing device relative to the control interface, the sensing device generating the indicating data using at least some of the coded data.

2. The system of claim 1 in which the at least one operation relating to the at least one command is associated with at least one zone of the control interface.

3. The system of claim 1 which includes the sensing device, the sensing device generating, using at least some of the coded data, at least one of movement data and position data, the movement data being indicative of the movement of the sensing device relative to the control interface, the position data being indicative of the position of the sensing device relative to the control interface.

4. The system according to claim 1, wherein each mark represents one of a plurality of coded values.

5. The system according to claim 4, wherein the coded value represented by a mark is at least partially determined by the position of the mark relative to the set of predetermined nominal mark positions.

6. The system according to claim 1, wherein the predetermined nominal mark positions are arranged relative to a plurality of nominal parallel lines.

7. The system according to claim 6 wherein at least one pair of the parallel lines are spaced apart from one another by a distance of less than 100 millimeters.

8. The system according to claim 1, wherein the marks have centers and wherein the relative spacing of the centers of at least one pair of adjacent marks is less than 12 millimeters.

9. The system according to claim 1, wherein each mark has a minimum radius and a maximum radius and wherein the length of a mark's minimum radius is greater than 40% of the length of that mark's maximum radius.

10. The system according to claim 1, wherein any 10 millimeter diameter area of the coded data indicative of the identity of the control interface includes sufficient information to identify the control interface.

11. The system according to claim 1, wherein any 10 millimeter diameter area of the coded data indicative of the at least one reference point of the control interface includes sufficient information to identify the at least one reference point.

12. The system of any one of claim 1 in which the at least one operation relating to the at least one command is selected from the group comprising:
  selecting said telephone from a list of telephones;
  selecting a telephone number from a list of telephone numbers;
  registering user access to control the telephone; and
  authorising user access to control the telephone.

13. The system of claim 1 in which the at least one operation relating to the at least one command is selected from the group comprising:
  issuing the at least one command to the telephone to cause the telephone to perform the at least one function; and
  issuing the at least one command to a telephone control system to cause the telephone to perform the at least one function, the telephone being operatively connected to the telephone control system.

14. The system of claim 13 in which the at least one function is selected from the group comprising:
  dialling a pre-determined telephone number;
  making an outgoing call to a pre-determined telephone number;
  sending text information;
  receiving an incoming call; and
  receiving and storing text information; and
  displaying text information on a display of said telephone.

15. The system of claim 13 in which the computer is operative to issue the at least one command through the sensing device.

16. The system of claim 13 in which the computer is operative to issue the at least one command independently of the sensing device.

17. The system of claim 1 in which the sensing device is embedded in said telephone.

18. A system for enabling at least one function of a telephone to be controlled, the telephone being operative to perform the at least one function in response to at least one command, the system including:
  a control interface containing information relating to the at least one function, the control interface including coded data indicative of at least one operation relating to the at least one command, the coded data comprising a plurality of substantially undifferentiated marks positioned relative to a set of predetermined nominal mark positions; and
  a netpage printer operative to receive, from a sensing device, indicating data regarding said at least one operation and at least one of movement data and position data regarding at least one of a movement and a position of the sensing device relative to the control interface, and for effecting, from the indicating data and at least one of the movement data and the position data, the at least one operation relating to the at least one command, the sensing device, when moved relative to the control interface, generating the indicating data using at least some of the coded data and generating at least one of the movement data and the position data.

19. The system according to claim 18, wherein any 10 millimeter diameter area of the coded data indicative of the at least one operation relating to the at least one command includes sufficient information to identify the at least one operation.

20. A system for enabling at least one function of a telephone to be controlled, the telephone being operative to perform the at least one function in response to at least one command, the system including:
  a control interface including coded data indicative of an identity of the control interface, the coded data comprising a plurality of substantially undifferentiated marks positioned relative to a set of predetermined nominal mark positions; and
  a netpage printer operative to receive, from a sensing device, identity data regarding an identity of a user and indicating data regarding the identity of the control interface, and for effecting, from the identity data and the indicating data, at least one operation relating to the at least one command, the sensing device containing the identity data and generating the indicating data using at least some of the coded data.

21. The system of claim 20 which includes the sensing device, the sensing device generating at least one of movement data and position data, the movement data being indicative of the movement of the sensing device relative to the control interface, the position data being indicative of the position of the sensing device relative to the control interface.

* * * * *